US 6,731,809 B1

(12) United States Patent
Taniguchi et al.

(10) Patent No.: US 6,731,809 B1
(45) Date of Patent: May 4, 2004

(54) MOVING PICTURE DATA COMPRESSION DEVICE

(75) Inventors: Toshinori Taniguchi, Nagoya (JP); Norio Tagawa, Nagoya (JP); Makoto Matsuda, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/300,484

(22) Filed: Apr. 28, 1999

(30) Foreign Application Priority Data

Apr. 28, 1998 (JP) .......................... 10-119427
Apr. 28, 1998 (JP) .......................... 10-119428

(51) Int. Cl.[7] ................................ G06K 9/36
(52) U.S. Cl. ................. 382/236; 382/232; 375/240.1
(58) Field of Search ............... 382/236, 232; 375/240.1; 345/723, 670; 348/14.12; 707/3; 709/206

(56) References Cited

U.S. PATENT DOCUMENTS

| | | | | |
|---|---|---|---|---|
| 4,667,190 A | * | 5/1987 | Fant ........................... 340/747 |
| 4,740,909 A | * | 4/1988 | Conklin et al. .............. 364/900 |
| 5,159,633 A | * | 10/1992 | Nakamura .................... 380/30 |
| 5,287,420 A | * | 2/1994 | Barrett ........................ 382/232 |
| 5,351,085 A | * | 9/1994 | Coelho et al. ............... 348/391 |
| RE34,965 E | | 6/1995 | Sugiyama .................... 348/415 |
| 5,440,346 A | * | 8/1995 | Alattar et al. ............... 348/420 |
| 5,467,326 A | * | 11/1995 | Miyashita et al. ............ 369/30 |
| 5,509,089 A | * | 4/1996 | Ghoshal ...................... 382/236 |
| 5,583,708 A | * | 12/1996 | Lee .............................. 360/50 |
| 5,608,651 A | * | 3/1997 | Leavy et al. ............ 364/514 R |
| 5,619,995 A | * | 4/1997 | Lobodzinski ............ 128/653.1 |
| 5,646,906 A | * | 7/1997 | Lee ............................. 365/240 |
| 5,699,124 A | * | 12/1997 | Nuber et al. ................. 348/465 |
| 5,701,439 A | * | 12/1997 | James et al. ................. 395/500 |
| 5,719,988 A | * | 2/1998 | Blecksmith et al. ........ 386/121 |
| 5,872,820 A | * | 2/1999 | Upadrasta ................... 375/356 |
| 5,872,936 A | * | 2/1999 | Eckstein ..................... 395/287 |
| 5,903,734 A | * | 5/1999 | Chida .................... 395/200.62 |
| 5,991,836 A | * | 11/1999 | Renda ......................... 710/58 |
| 6,002,719 A | * | 12/1999 | Parvulescu et al. ......... 375/240 |
| 6,023,233 A | * | 2/2000 | Craven et al. ................ 341/51 |
| 6,094,522 A | * | 7/2000 | Ito et al. ....................... 386/52 |
| 6,138,147 A | * | 10/2000 | Weaver et al. .............. 709/206 |
| 6,151,375 A | * | 11/2000 | Nakatsugawa ............. 375/370 |
| 6,172,712 B1 | * | 1/2001 | Beard ......................... 348/552 |
| 6,327,253 B1 | * | 12/2001 | Frink .......................... 370/260 |
| 6,449,608 B1 | * | 9/2002 | Morita et al. .................. 707/3 |

FOREIGN PATENT DOCUMENTS

JP JP405073252 A * 3/1993 ............. G06F/3/14

OTHER PUBLICATIONS

Tashiro et al., "MPEG2 Video and Audio CODEC Board Set for a Personal Computer", IEEE Global Telecommunications Conference , vol. 1, Nov. 1995, pps. 483–487.*
Hwang et al., "A Virtual Classroom for Real–Time Interactive Distance Learning", IEEE International Symposium on Circuits and Systems , vol. 3, Jun. 1998, pps. 611–614.*

* cited by examiner

*Primary Examiner*—Anh Hong Do
(74) *Attorney, Agent, or Firm*—Oliff & Berridge, PLC

(57) ABSTRACT

A moving picture data compression device 1 is provided with a controller 20 for inputting a realtime/non-realtime switch signal to switchers 30 and 40 when a realtime/non-realtime switch interrupt is received from a personal computer 3 in order to control a compressor 60 to compress either realtime data recorded on a video tape 5 or non-realtime data recorded on a video file 7 according to a user's desire. When compressing non-realtime data, the controller 20 sends a synchronization signal to the compressor 60, after outputting one field worth of video signal to a buffer 50, in order to instruct the compressor 60 to read data. When the controller 20 receives a one-field read end interrupt, indicative of the end of the reading operation, from the compressor 60, the controller 20 outputs the next field data to the buffer 50.

35 Claims, 24 Drawing Sheets

MOVING PICTURE DATA COMPRESSION DEVICE

BACKGROUND OF THE INVENTION

1. Field of the Invention

The present invention relates to a moving picture data compression device for reading and compressing moving picture data recorded on a recording medium.

2. Description of the Related Art

Along with the diversification of communication equipment in recent years, there have been proposals for various technologies performing communications and the like by using moving picture data after compressing it to reduce the data volume. One example of a moving picture data compression method well known in the art Is the MPEG (Moving Picture Experts Group) method.

Conventional recording media for recording moving picture data include videotapes, laser discs, and the Like. In recent years, such media as a hard disk and a video file (for example, ITU-R656 format video file) have also been used to store moving picture data. The videotape and the laser disc are known an realtime recording media because they can record moving picture data to be read sequentially according to the passage of time. The hard disk and video file are known as non-realtime recording media because they can record moving picture data to be read without concern for the passage of time.

SUMMARY OF THE INVENTION

There are two types of MPEG moving picture data compression device: a first type that compresses video data in real time; and a second type (software type) that performs its entire compression operation by executing a software process.

The first type of moving picture data compression device, however, has the capability of compressing only moving picture data read from a realtime recording medium. Accordingly, when a user desires to compress moving picture date from a non-realtime recording medium, he/she has to use the second type of compression device. Thus, according to the kind of data to be compressed, the user has to change the compression device to be used. This in troublesome for the user.

Considering this problem, it is conceivable to use the first type of device also to compress data from non-realtime data recording medium. According to this conceivable method, moving picture data read from a non-realtime recording medium (hereinafter referred to an non-realtime data) is first converted into moving picture data that can be recorded on a realtime recording medium (hereinafter referred to as realtime data). The resultant non-realtime data is then recorded temporarily onto a realtime recording medium such as a videotape. The recorded realtime data is then played beck on a video player or the like and is compressed by the moving picture data compression device of the first type. This method can pave the way for compressing non-realtime data using the moving picture data compression device of the first type. However, it requires a troublesome operation to compress non-realtime data.

It is also conceivable to execute editing processes such as noise elimination and gamma correction on non-realtime data in a manner described below. That is, non-realtime data in first converted to realtime data and then recorded onto a realtime recording medium. Subsequently, an editing device, corresponding to the desired editing process, is connected to the moving picture data compression device. Then, the realtime data is played beak and inputted to the moving picture data compression device. According to this operation, troublesome and complex operation is needed.

Hence, in order to perform several types of editing on non-realtime data, it is necessary not only to perform the above complex operations, but also to prepare individual editing equipment for handling each process.

Further, editing in performed after converting non-realtime data to realtime data. As a result, the same extremely difficult problems associated with processing ordinary realtime data, such as performing time lapse and rewind processes, are present in this case as well.

Even in order to perform relatively simple editing processes such as brightness adjustment, gamma correction, fade in, fade out, and the like, it is still necessary to prepare separate editing devices for each process. As a result, it in still necessary to perform complex operations in order to edit non-realtime data.

In view of the foregoing, it is an object of the present invention to provide an improved moving picture data compression device that is capable of compressing not only moving picture data read from realtime recording media (realtime data), but also moving picture data read from non-realtime recording media (non-realtime data) by a simple operation.

It is another object of the present invention to provide an improved moving picture data compression device that is capable of facilitating the process of editing non-realtime data and of broadening the scope of such editing.

In order to attain the above and other objects, the present invention provides a moving picture data compression device for compressing moving picture data read from a recording medium recorded with moving picture data, comprising: non-realtime data receiving means for receiving moving picture data read from a non-realtime data recording medium, which is recorded with moving picture data that is capable of being read unrelated to the passage of time; synchronization signal generating means for generating a synchronization signal based on moving picture data received by the non-realtime data receiving means; realtime data receiving means for receiving moving picture data that is read from a realtime data recording medium, which is recorded with moving picture data capable of being read sequentially according to the actual passage of time; additional synchronization signal generating means for generating a synchronization signal according to the receiving operation by the reltime data receiving means; and compressing means for selectively executing either non-realtime data compression operations for compressing moving picture data received by the non-realtime data receiving means according to the synchronization signal generated by the synchronization signal generating means or realtime data compression operations for compressing moving picture data received by the realtime data receiving means according to the synchronization signal generated by the additional synchronization signal generating means.

The synchronization signal generating means produces a synchronization signal based on moving picture data (non-realtime data) received from the non-realtime data recording medium. Although this synchronization signal is not always generated at a uniform interval, the compressing means is configured to be capable of executing non-realtime data compression operations onto the non-realtime data, according to the synchronization signal generated by the synchronization signal generating means. For this reason, the moving picture data compression device of the present invention is capable of easily compressing non-realtime data accurately and reliably.

The compressing means is configured to be capable of selectively executing either realtime data compression operations or non-realtime data compression operations. When executing realtime data compression operations, the compressing means can compress moving picture data (realtime data), in accordance with the synchronization signal generated by the additional synchronization signal generating means. When executing non-realtime data compression operations, the compressing means can compress moving picture data (non-realtime data), in accordance with the synchronization signal generated by the synchronization signal generating means. Hence, the Compressing means can easily compress both realtime and non-realtime data. Hence, the present invention can easily compress moving picture data recorded on various types of recording media and can provide this compressed data for various applications such as communications.

The non-realtime data receiving means may include non-realtime data reading means for reading moving picture data from the non-realtime data recording medium, wherein said synchronization signal generating means generates the synchronization signal based on the moving picture data read by the non-realtime data reading means, and wherein said compressing means executes the non-realtime data compression operations for compressing moving picture data, read by the non-realtime data reading means, according to the synchronization signal. The non-realtime data receiving means may further include non-realtime data read controlling means for controlling operations of the non-realtime data reading means to read moving picture data from the non-realtime date recording medium.

The synchronization signal generating means may generate the synchronization signal based on the moving picture data from the non-realtime data recording medium, in accordance with the reading operation achieved by the non-realtime data reading means as controlled by the non-realtime data read controlling means. The realtime data receiving means may include realtime data reading means for reading moving picture data from a realtime data recording medium.

The compression means may include witching means for receiving an instruction signal indicative of a desire whether to perform the realtime data compression operations or to perform the non-realtime data compression operations, and for switching the function of the compressing means between the realtime data compression operations and the non-realtime data compression operations according to the received instruction signal.

According to this structure, the switching means enables the compression means to switch, according to the received instruction signal, between executing realtime data compression operations and executing non-realtime data compression operations. Accordingly, if both realtime data and non-realtime data are inputted simultaneously, the moving picture data compression device can ensure that only a desired type of data will be compressed. Hence, it is possible to reliably compress only the desired data. Further, when both realtime and non-realtime data are inputted simultaneously, it is possible to switch the data to be compressed at desired timings and connect the data together later, enabling a wide variety of editing effects.

The moving picture data compression device may further comprise delaying means for controlling the compressing means to delay performing the non-realtime data compression operations when a time interval, in which the synchronization signal generating means generates a synchronization signal, is longer than a period of time required by the compressing means to perform non-realtime data compression operations.

When the time interval required for the synchronization signal generating means to generate a synchronization signal is longer than the time required for the compressing means to perform a compression operation on non-realtime data, the delaying means delays the non-realtime data compression operation performed by the compression means. As described above, the synchronization signal generated by the synchronization signal generating means is not always a uniform time interval. Therefore, if the interval required to generate the synchronization signal in longer than the time required for the compression means to perform a non-realtime data compression operation, the delaying means controls the compression means to delay in performing the non-realtime data compression operation. Accordingly, it is possible to execute accurately and reliably a non-realtime data compression operation with the compression means.

The compressing means may detect a difference between successively-received moving picture data to execute at least non-realtime data compression operations, wherein the delaying means controls the compression means to delay performing the non-realtime data compression operations by controlling the compressing means to halt temporarily operations at least involved in detecting the difference.

The compressing means may utilize the difference between successively-received sets of moving picture data to execute non-realtime data compression operations. This is a relatively common compression method used, for example, in MPEG format and the like and is very effective for compressing moving picture data. In this case, the delaying means delays the non-realtime data compression operations by temporarily halting operations by the compressing means related to detecting the difference. It is noted that generally, calculation of this difference is performed in a closed loop feedback process regardless of whether the calculation is performed on software or hardware. For this reason, data can gradually change if operations related to detection of the difference calculation are not halted. Further, errors will possibly occur if new moving picture data to be used for calculating the difference is no longer inputted. Accordingly, non-realtime data compression operations are delayed by temporarily halting operations related to the difference calculation. Accordingly, non-realtime data compression operations can be executed even more accurately and reliably. Accordingly, the present invention has the effect of being able to more reliably and accurately execute the compression of non-realtime data.

The moving picture date compression device may further comprises processing means capable of executing at least two types of processes on either one of moving picture data read by the non-realtime data reading means and operations of the non-realtime data reading means; and selecting means for selecting the process to be executed by the processing means.

With the construction described above, the processing means can execute at least two types of processes on the non-realtime data or the operations of the non-realtime date reading means. The selecting means selects a process that the processing means executes on either the moving picture data or the operations. Accordingly the device of the present invention can directly execute the desired processes on the non-realtime data. Moreover, the present invention enables a desired process to be selected and executed from a plurality of processes, without the need to reconnect a corresponding equipment to the device. Accordingly, non-realtime date can be edited with ease.

It is therefore possible to easily perform a wide variety of processes, such as rewind and time elapse processes, on non-realtime data using simple conversion processes performed with computer programs, for example. Operations of the non-realtime data reading means can be processed in a similar manner. Further, when performing processes on non-realtime data or on reading operations using software conversion processes, it is extremely easy to select and execute desired processes from a plurality of available processes merely by switching software programs. Therefore, without complicating the structure of the device, the present invention enables the user to perform a wide variety of processes, thereby increasing the number of editing operations capable of being effected on non-realtime data.

The compressing means may receive either one of the non-realtime data processed by the processing means and the non-realtime data read by the non-realtime data reading means whose operation is processed by the processing means, further comprising delaying means for controlling the compression means to delay performing compression operations when a period of time, required for the processing means to execute selected processes, is longer than another period of time required for the compressing means to perform the non-realtime data compression processes.

Thus, when the time required for the processing means to execute selected processes is longer than the time required for the compressing means to perform a compression operation, the delaying means delays the compression operation. Accordingly, it is possible to execute compression operations accurately and reliably even when a relatively long period of time is required to execute selected process.

For example, the compressing means may compress data using the difference between successively-received sets of moving picture data. If the operations performed by this compression means are quicker than the time interval in which moving picture data is inputted to the compression means, an error will possibly be generated because the data becomes altered or because new moving picture data, required to detect the difference between successive moving picture data, has not been inputted. Therefore, by delaying the compression operation, it is possible to execute compression operations accurately and reliably. Accordingly, the compression operations can be executed accurately and reliably even when the selected process is relatively complex, for example even when the selected process is a process executed in software that has a relatively large number of steps. Therefore, the present invention has the effect of enabling the user to further increase the range of editing operations capable of being effected onto non-realtime data.

The processing means may execute the selected processes on the non-realtime data before the compressing means perform compression operations. When executing processes on non-realtime date before the data is compressed by the compressing means, the process can be executed directly on the original non-realtime data. Therefore, it is possible to perform an extremely wide variety of processes. Accordingly, the present invention has the affect of enabling a greater editing range for non-realtime data.

The processing means may execute the selected processes on non-realtime data after the compressing means performs compression operations onto the non-realtime data. Less data need be processed when processing non-realtime data that has already been compressed by the compressing means into variable-length encoded data, for example. Accordingly, processing is simplified and can be performed faster. Accordingly, the present invention further reduces the time required to edit non-realtime data. In addition, less memory capacity is required to store the reduced amount of data, thereby reducing production costs.

The non-realtime data may include indication data indicating processes to be executed by the processing means wherein the selecting means selects the processes indicated by the indication data. When non-realtime data includes indication data indicating processes to be executed by the processing means, the selecting means automatically changes the processes to be selected based on the indication data. Hence, simply by assigning indication data to non-realtime data, it is possible to automatically let the processing means perform a desired editing operation on non-realtime data. Accordingly, the present invention further simplifies the editing of non-realtime data.

According to another aspect, the present invention provides a moving picture data compression device for compressing moving picture data read from a recording medium recorded with moving picture data, comprising: non-realtime data receiving means for receiving moving picture data from a non-realtime data medium that is recorded with moving picture data capable of being read without regard for the passage of time; compressing means capable of compressing moving picture data; processing means capable of executing at least two types of processes on moving picture data received by the non-realtime data receiving means; and selecting means for selecting the process for the processing means to execute on the moving picture data.

The non-realtime data receiving means may includes: non-realtime data reading means for reading moving picture data from the non-realtime data medium; and read controlling means for controlling the operations of the non-realtime data reading means, wherein the processing means is capable of executing at least two types of processes on either moving picture data read by the non-realtime data reading means or operations of the non-realtime data reading means that are controlled by the read controlling means, the selecting means selecting the process for the processing means to execute on the moving picture data or the operations.

According to still another aspect, the present invention provides a moving picture data compression device for compressing moving picture data read from a recording medium recorded with moving picture data, comprising: a non-realtime data receiving unit receiving moving picture data read from a non-realtime data recording medium, which is recorded with moving picture data that is capable of being read unrelated to the passage of time; a synchronization signal generating unit generating a synchronization signal based on moving picture data received by the non-realtime data receiving unit; a realtime data receiving unit receiving moving picture data that is read from a realtime data recording medium, which in recorded with moving picture data capable of being read sequentially according to the actual passage of time; an additional synchronization signal generating unit generating a synchronization signal according to the receiving operation by the realtime data receiving units and a compressing unit selectively executing either non-realtime data compression operations for compressing moving picture data received by the non-realtime data receiving unit according to the synchronization signal generated by the synchronization signal generating unit or realtime data compression operations for compressing moving picture data received by the realtime data receiving unit according to the synchronization signal generated by the additional synchronization signal generating unit.

According to a further aspect, the present invention provides a moving picture data compression device for compressing moving picture data read from a recording medium recorded with moving picture data, comprising: a non-realtime data receiving unit receiving moving picture data from a non-realtime data medium that is recorded with moving picture data capable of being read without regard for the passage of time; a compressing unit capable of compressing moving picture data; a processing unit capable of executing at least two types of processes on moving picture data received by the non-realtime data receiving unit; and a selecting unit selecting the process for the processing unit to execute on the moving picture data.

DETAILED DESCRIPTION OF THE PREFERRED EMBODIMENTS

A moving picture data compression device according to preferred embodiments of the present invention will be described while referring to the accompanying drawings.

First Embodiment

A moving picture data compression device according to a first preferred embodiment of the present invention will be described with reference to FIGS. 1 to 10.

Figure 1:
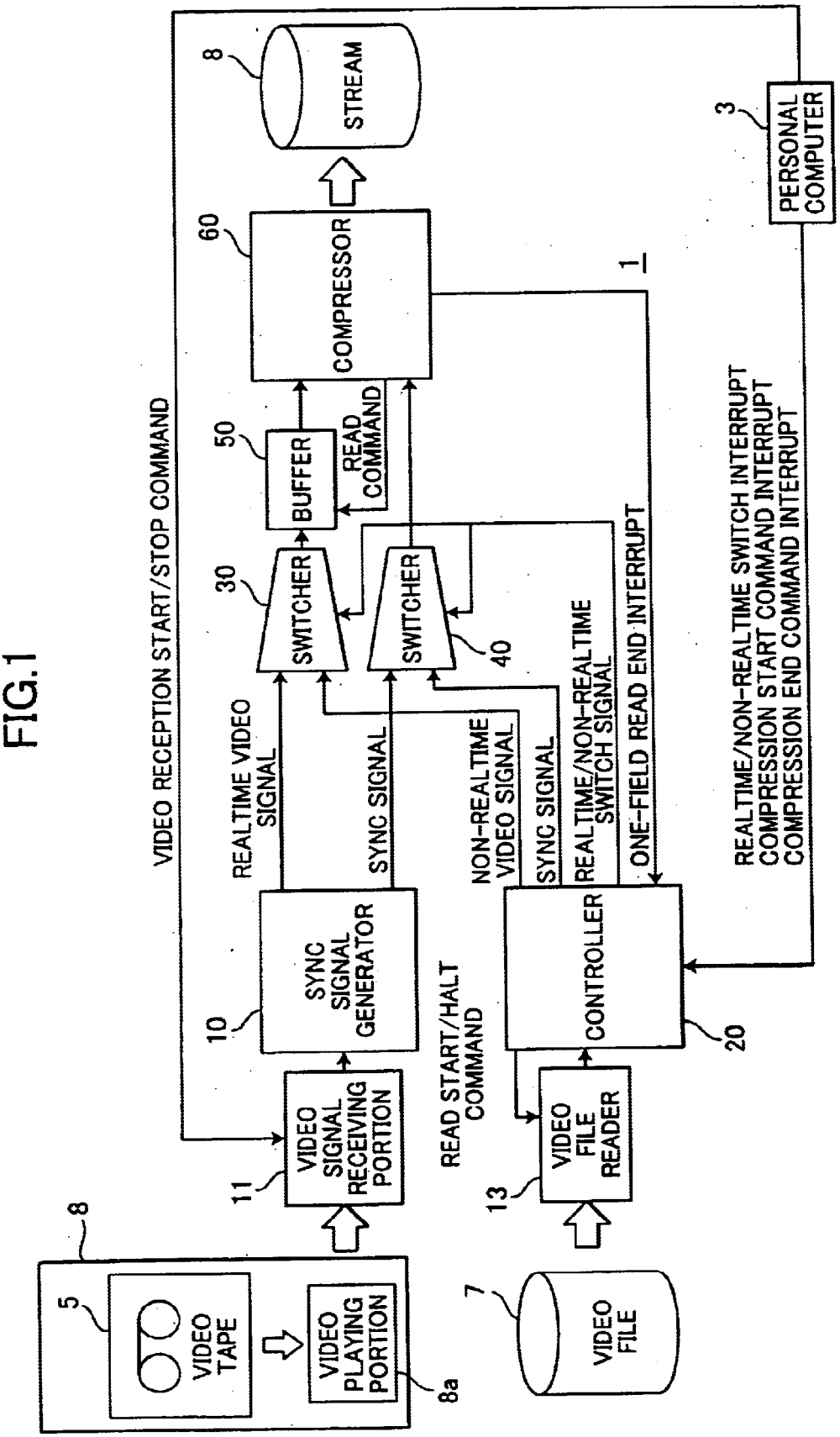
FIG. 1 is a block diagram showing tho structure of a moving picture data compression device according to a first embodiment the present invention.

FIG. 1 is a block diagram showing the general structure of the moving picture data compression device 1 according to the first embodiment. The moving picture data compression device 1 of the present embodiment is for compressing data read from a videotape 5 or a video file 7 such as a ITU-R656 format video file, and for outputting the compressed data as a stream 8. It is noted that the videotape 5 is a realtime data recording medium, in which moving picture data is recorded to be read sequentially according to the passage of time. The video file 7 is a non-realtime data recording medium, in which moving picture data is recorded to be read unrelated to the passage of time.

As shown in FIG. 1, the moving picture data compression device 1 is connected to a personal computer 3, and is controlled according to instructions inputted from the personal computer 3 in response to a user's manipulation on the personal computer 3. According to the instructions from the personal computer 3, the moving picture data compression device 1 compresses moving picture data read from the videotape 5 or the video file 7 and outputs the compressed data as a stream 8.

It is noted that instructions supplied from the personal computer 3 include: a realtime/non-realtime switch interrupt, a compression start command interrupt, a compression and command interrupt, a video reception start command, a video reception stop command, and the like. That is, the personal computer 3 issues a realtime/non-realtime switching interrupt when the user operates the personal computer 3 to input his/her desire to switch a subject, to be compressed, between data from the videotape 5 and data from the video file 7. The personal computer 3 issues a compression start command interrupt and a video reception start command when the user operates the personal computer 3 to input his/her desire to start compressing video data. The personal computer 3 issues a compression end command interrupt and a video reception stop command when the user operates the personal computer 3 to input his/her desire to stop compressing video data.

As shown in FIG. 1, the moving picture data compression device 1 includes: the videotape player portion 8: a video signal reception portion 11; a synchronization signal generator 10; a video file reading portion 13; a controller 20; a switcher 30; another switcher 40; a buffer 50; and a compressor 60.

The videotape player portion 8 is for playing a videotape 5 to read information from the videotape 5 and to output digital video signals (D1 video signals defined in ANSI/SMPTE 259M standard, for example). The video signal reception portion 11 is for receiving digital video signals from the videotape player portion 8 and for converting digital video signals into digital video data of a suitable format (which will be referred to as "realtime data," hereinafter) in a well-known manner. The synchronization signal generator 10 is for generating synchronization signals based on digital video data received from the video signal reception portion 11, and for outputting the generated synchronization signals together with the received digital video data. The video file reading portion 13 is for reading information from the video file 7 and for outputting digital video data (which will be referred to an "non-realtime data" hereinafter). The controller 20 is for performing entire control operation of the device 1. The controller 20 is also for performing transfer timing control for transferring non-realtime data from the video file reading portion 13 to the compressor 60 and for generating synchronization signals in synchronization with the transfer of the non-realtime data. The switcher 30 is for switching between realtime video data, outputted from the synchronization signal generator 10, and non-realtime video data, transferred from the file reading portion 13. The other switcher 40 is for switching between synchronization signals, outputted from the synchronization signal generator 10, and synchronization signals, outputted from the controller 20. The buffer 50 is for temporarily storing realtime video data or non-realtime video data supplied from the switcher 30. The compressor 60 is for compressing realtime video data or non-realtime video data stored in the buffer 50.

The structure of the moving picture data compression device 1 will be described below in greater detail.

The videotape player portion 8 is mounted with a videotape 5. The videotape player portion 8 includes a videotape playing portion 8a, that plays the videotape 5 to read information from the videotape 5 and outputs digital video signals in a well-known manner. A user can manually control the videotape player portion 8 so that the videotape playing portion 8a starts playing the videotape 5 to output successive fields' worth of video signals.

Figure 2A:
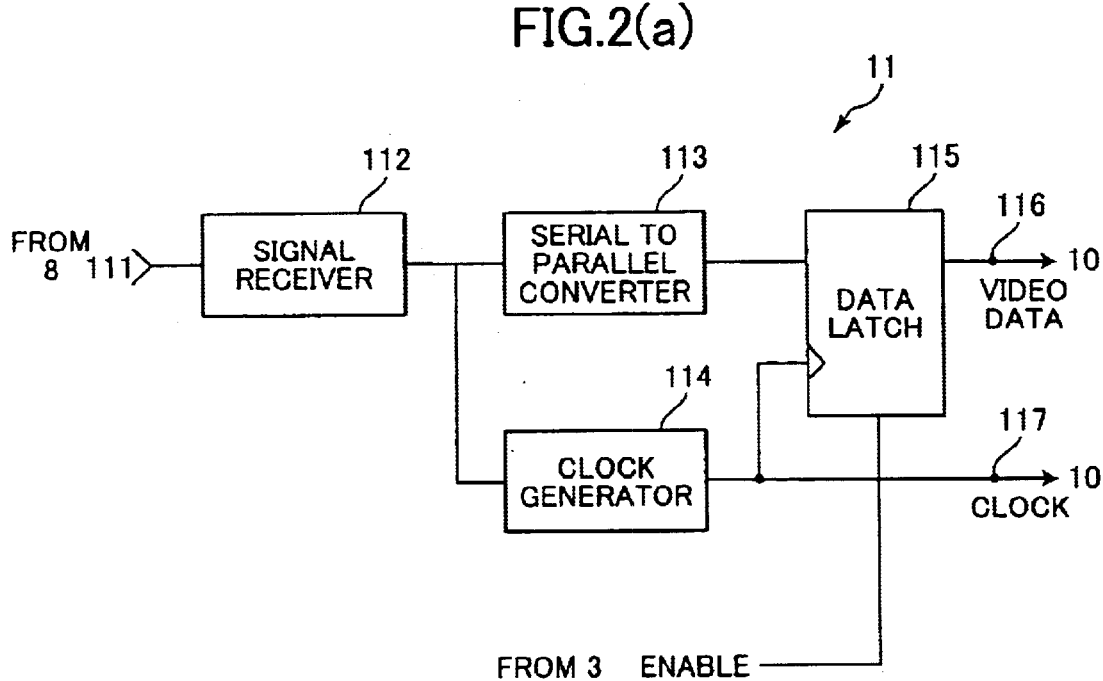
FIG. 2(a) is a block diagram of a video signal receiving portion in the moving picture data compression device.

The video signal reception portion 11 is connected to the videotape playing portion 8a. The video signal reception portion 11 receives digital video signals from the videotape playing portion 8a, and converts the digital video signals into digital video data of a suitable format in a well-known manner. For example, the video signal reception portion 11 has a structure as shown in FIG. 2(a). More specifically, the video signal reception portion 11 includes a video signal input 111 connected to the playing portion 8a of the video player portion 8; a signal receiver 112 for receiving video signals inputted from the playing portion 8a; a serial-parallel converter 113 for converting the serially-inputted video signals into parallel video data; a clock generator 114 for generating clock signals in synchronization with the reception of the video signals and for outputting the clock signals via a clock output 117 to the synchronization signal generator 10; and a data latch 115 for temporarily latching the video data before outputting the video data from a digital video output 116. It is noted that the video signal reception portion 11 is connected to the personal computer 3 so that the data latch 115 be inputted with an enable signal supplied from the personal computer 3. The personal computer 3 issues the video reception start commands switching the enable signal into an enabled state. The personal computer 3 issues the video reception stop command as switching the enable signal into a disabled state. Thus, the video signal reception portion 11 can start its operation in response to a video reception start command issued from the personal computer 3, and stop its operation in response to a video reception stop command issued from the personal computer 3.

Figure 2B:
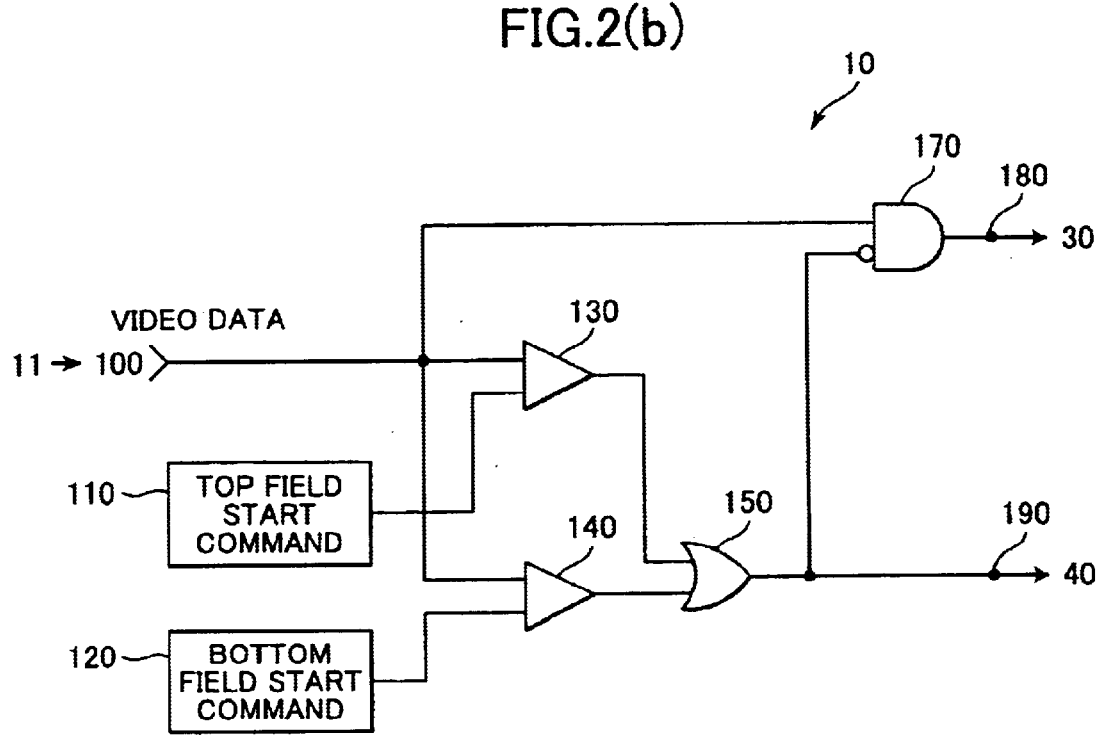
FIG. 2(b) is a circuit diagram of a synchronization signal generator in the moving picture data compression device.

The synchronization signal generator 10 is connected to the video signal receiving portion 11, and is driven by the clock signals supplied from the clock generator 114 in the video signal receiving portion 11. The synchronization signal generator 10 has a structure as shown in FIG. 2(b). That is, the synchronization signal generator 10 includes: a digital video data input terminal 100 for receiving video data from the video signal reception portion 11; a comparator 130; another comparator 140; an OR gate 150; an AND gate 170; a video data output terminal 180; and a synchronization signal output terminal 190. The comparator 130 is inputted with: digital video data from the video signal reception portion 11; and data of a predetermined top field start code 110. The other comparator 140 is inputted with: the digital video data from the video signal reception portion 11; and data of another predetermined bottom field start code 120. With this structure, when a top field start code or a bottom field start code is received from the video signal reception portion 11, the top field start code or a bottom field start code in outputted as a synchronization signal via the synchronization signal output terminal 190 to the switcher 40. Receiving digital video data from the video signal reception portion 11, the AND gate 170 separates a video data portion for actual images from top/bottom field start codes. The AND gate 170 outputs the thus separated video data via the output terminal 160 to the switcher 30. Thus, the synchronization signal generator 10 outputs realtime video data for actual images and synchronization signals separately. The realtime video data for actual images is outputted to the switcher 30, while the synchronization signal is outputted to the switcher 40.

The video file reading portion 13 is for retrieving digital data from the video file 7, converting a format of the digital data into another format suitable for digital video data, and outputting the properly-formatted digital video data to the controller 20. The video file reading portion 13 is constructed from a microcomputer system, comprised from a CPU, a ROM, a RAM, and the like (not shown) for executing a driver software program. The video file reading portion 13 starts its operation in response to a read start command supplied from a file data input switch 21 (described later) In the controller 20. The video file reading portion 13 stops or halts its operation in response to a read halt command supplied also from the file data input switch 21.

As described later, the controller 20 receives the digital video data from the video file reading portion 13, and supplies the non-realtime video data to the switcher 30. The controller 20 also produces synchronization signals in synchronization with the supply of the non-realtime video data to the switcher 30. The controller 20 supplies the synchronization signals to the switcher 40. The controller 20 also serves to output a realtime/non-realtime switch signal to the switchers 30 and 40.

The switcher 30 receives realtime video data from the synchronization signal generator 10 and non-realtime video data from the controller 20. Based on the realtime/non-realtime switch signal, the switcher 30 determines whether to output video data from the synchronization signal generator 10 or that from the controller 20 to the buffer 50. The switcher 30 therefore selectively supplied realtime video data from the synchronization signal generator 10 or non-realtime video data from the controller 20 to the buffer 50. The buffer 50 receives video data that has passed through the switcher 30, and temporarily stores the video date until receiving a read command from the compressor 60.

The switcher 40 can receive synchronization signals from the synchronization signal generator 10 and synchronization signal from the controller 20. Based on the realtime/non-realtime switch signal, the switcher 40 determines whether to output synchronization signals from the synchronization signal generator 10 or synchronization signals from the controller 20 to the compressor 60. The switcher 40 therefore selectively supplies synchronization signals from the synchronization signal generator 10 or synchronization signals from the controller 20 to the compressor 60. Thus, the synchronization signals that have passed through the switcher 40 are directly inputted into the compressor 60.

Based on the signals inputted into the compressor 60 as described above, the compressor 60 compresses video data into the MPEG format and outputs the compressed data as a stream 8. It is noted that in addition to the realtime/non-realtime switch signal, other various signals are inputted and outputted among the controller 20, switcher 30, switcher 40, buffer 50, and compressor 60. These signal, will be described later in detail.

Next the controller 20 will be described in greater detail with reference to FIG. 3.

Figure 3:
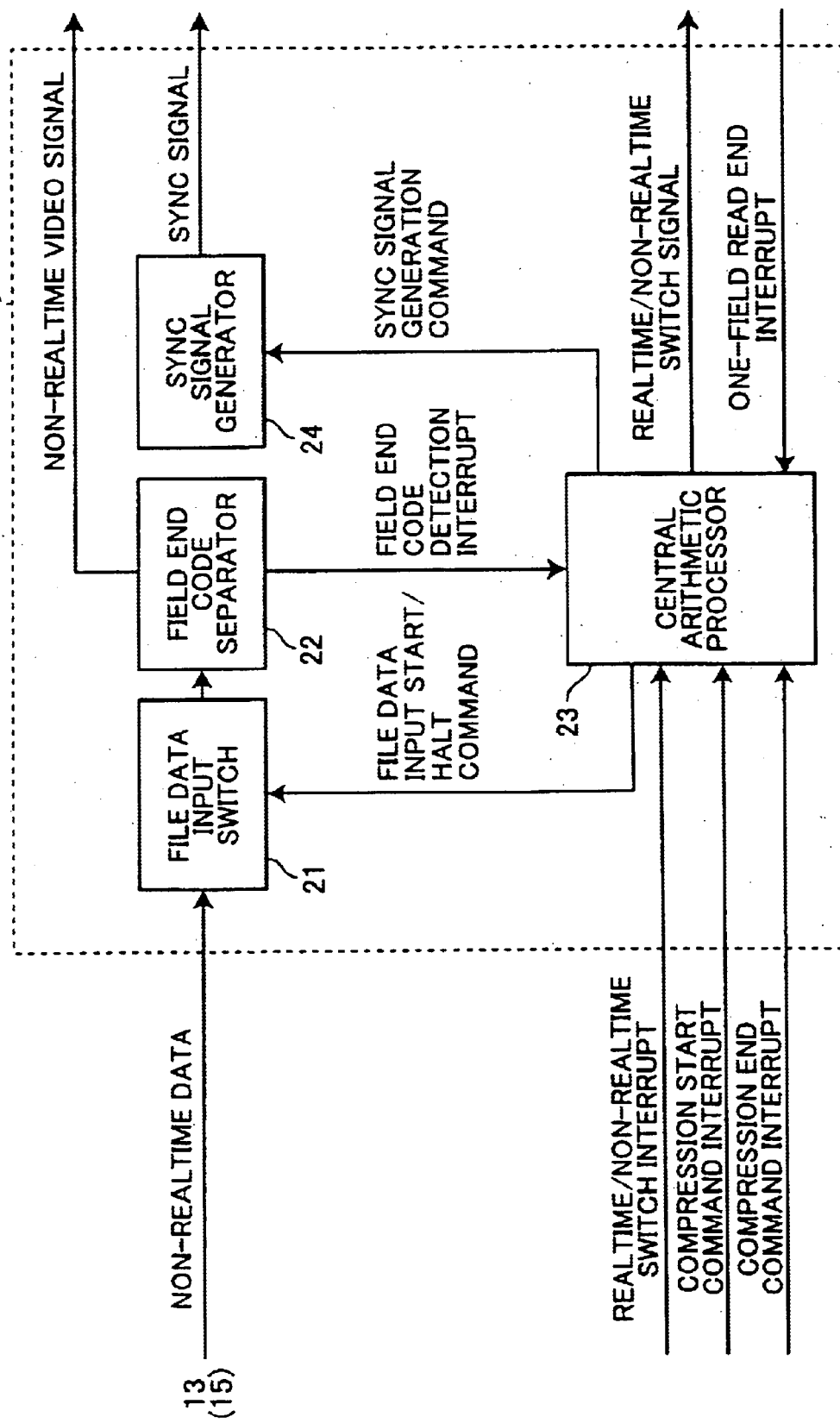
FIG. 3 is a block diagram showing the structure of a controller for the moving picture data compression device.

As shown in FIG. 3, the controller 20 includes: a file data input switch 21; a field end code separator 22; a central arithmetic and program controller 23; and a synchronization signal generator 24.

The central arithmetic and program controller 23 is for controlling the entire portion of the controller 20. Although not shown in the drawing, the central arithmetic and program controller 23 is a microcomputer provided with a CPU, ROM, RAM, and the like. A data compression program whose flowchart in shown in FIGS. 6–10 is prestored in the ROM, and is executed by the CPU. The file data input switch 21, the field end code separator 22, and the synchronization signal generator 24 are connected to the arithmetic and program controller 23.

The arithmetic and program controller 23 executes the data compression process of FIGS. 6–10 while receiving a realtime/non-realtime switching interrupt, a compression start command interrupt, and a compression end command interrupt from the personal computer 3 in accordance with the user's manipulation on the personal computer 3.

As will be described later, the central arithmetic and program controller 23 also receives a field and code detection interrupt from the field end code separator 22. The field end code separator 22 issues the field end code detection interrupt when the field and code separator 22 has completely received one-field's worth of video data. The central arithmetic and program controller 23 further receives a one field read and interrupt from the compressor 60. The compressor 60 issues the one field read end interrupt when the compressor 60 completes reading one-field's worth of video data from the buffer 50 for compression.

The central arithmetic and program controller 23 outputs a realtime/non-realtime switching signal to the switchers 30 and 40 in response to the realtime/non-realtime switch interrupt. The central arithmetic and program controller 23 outputs a file data input start command to the file data input switch 21 in response to the compression start command interrupt and the one field read end interrupt. In response to the field end code detection interrupt, the central arithmetic and program controller 23 outputs a file data input halt command to the file data input switch 21 and outputs a synchronization signal generation command to the synchronization signal generator 24.

The file data input switch 21 is capable of receiving video data (non-realtime data) from the file reading portion 13. When receiving a file data input start command from the arithmetic and program controller 23, the file data input switch 21 enables receiving of the non-realtime data from the file data resolving portion 13. More specifically, the file data input switch 21 outputs a read start command to the file reading portion 13 so that the reading portion 13 will start reading data from the video file 7. Accordingly, the video data passes through the file data input switch 21 and is inputted into the field end code separator 22. On the other hand, when receiving a file data input halt command from the arithmetic and program controller 23, the file data input switch 21 disables receiving of the non-realtime data. That is, the file data input switch 21 outputs a read halt command to the file reading portion 13 so that the reading portion 13 will stop reading data from the video file 7. Thus, based on the file data input start command and the file data input halt command, the file data input switch 21 toggles between supplying non-realtime data and not supplying non-realtime data to the field end code separator 22.

The field end code separator 22 is for separating, from the received digital video data, video data for actual images and field start codes.

Figure 4:
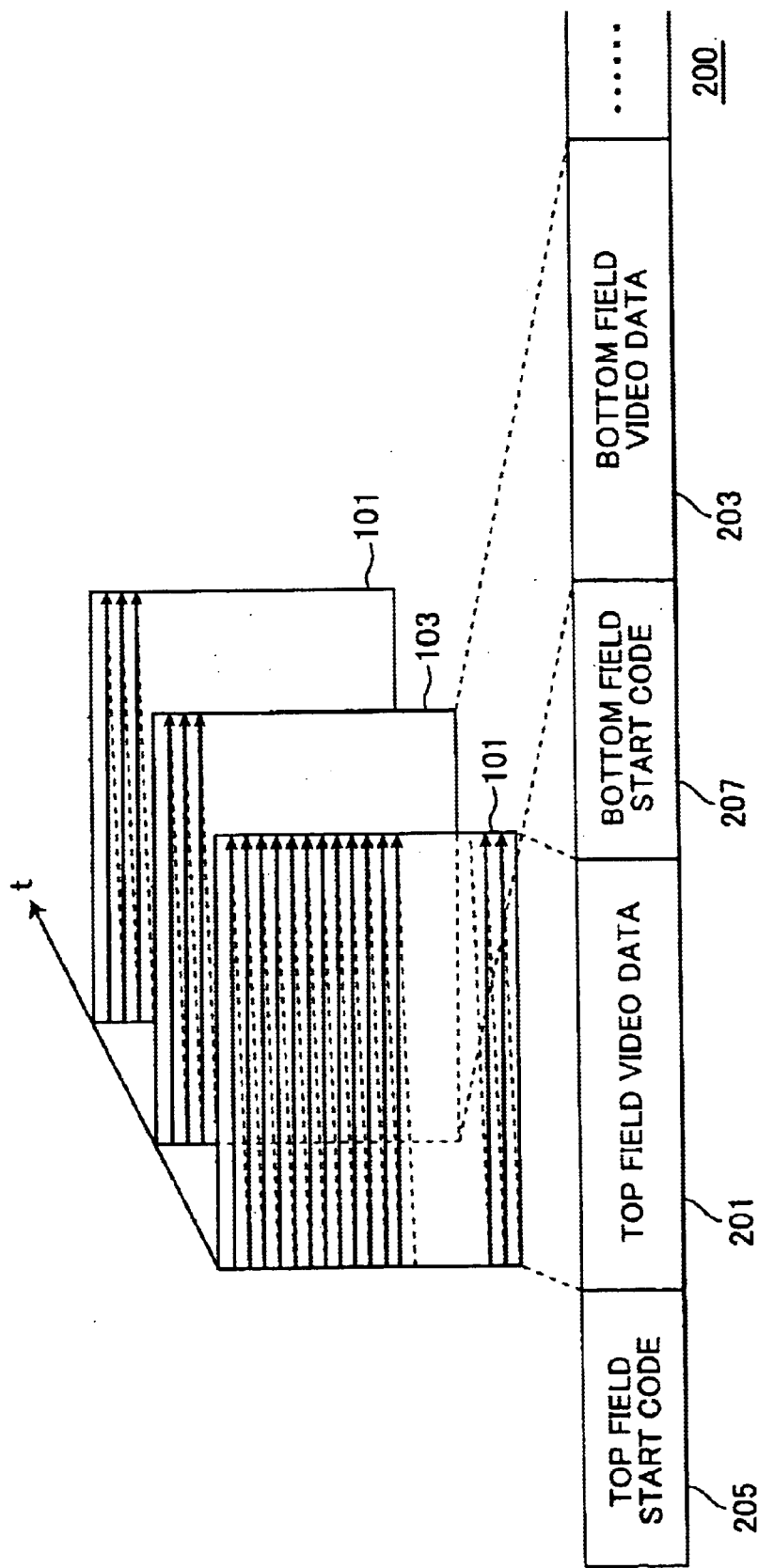
FIG. 4 is an explanatory diagram shoving the structure of non-realtime data.

As shown in FIG. 4, normal video images are formed alternately of two images, called a top field 101 and a bottom field 103, that differ in positions of their scanning lines. Each frame is formed from both of the top field 101 and the bottom field 103. As also shown in FIG. 4, each non-realtime data file 200 read from the video file 7 is constructed such that a plurality of sets of top field video data 201 and a plurality of sets of bottom field video data 203 are alternately provided in the non-realtime data file 200. One net of top field video data 201 forms a video image for a top field 101, while one set of bottom field video data 203 forms a video image for a bottom field 103. A top field start code 205 and a bottom field start code 207 are provided at the head of the top field video data 201 and bottom field video data 203, respectively, to indicate the start of the respective video data.

The field end code separator 22, shown in FIG. 3, separates the non-realtime data, received via the file data input switch 21, into: the top field video data 201 and the bottom field video data 203 (hereinafter both are referred to as the non-realtime video signal); and the top field start code 205 and bottom field start code 207. Subsequently, the field end code separator 22 outputs the newly separated non-realtime video signal (top field video data 201 or bottom field video data 203) to the switcher 30. Further, when detecting the head of either the top field start code 205 or bottom field start code 207, the field and code separator 22 outputs a field end code detection interrupt to the arithmetic and program controller 23.

The synchronization signal generator 24 is for generating a synchronization signal when receiving a synchronization signal generation command from the arithmetic and program controller 23. The synchronization signal generator 24 outputs the synchronization signal to the switcher 40.

Next, the structure of the compressor 60 will be described with reference to FIG. 5.

Figure 5:
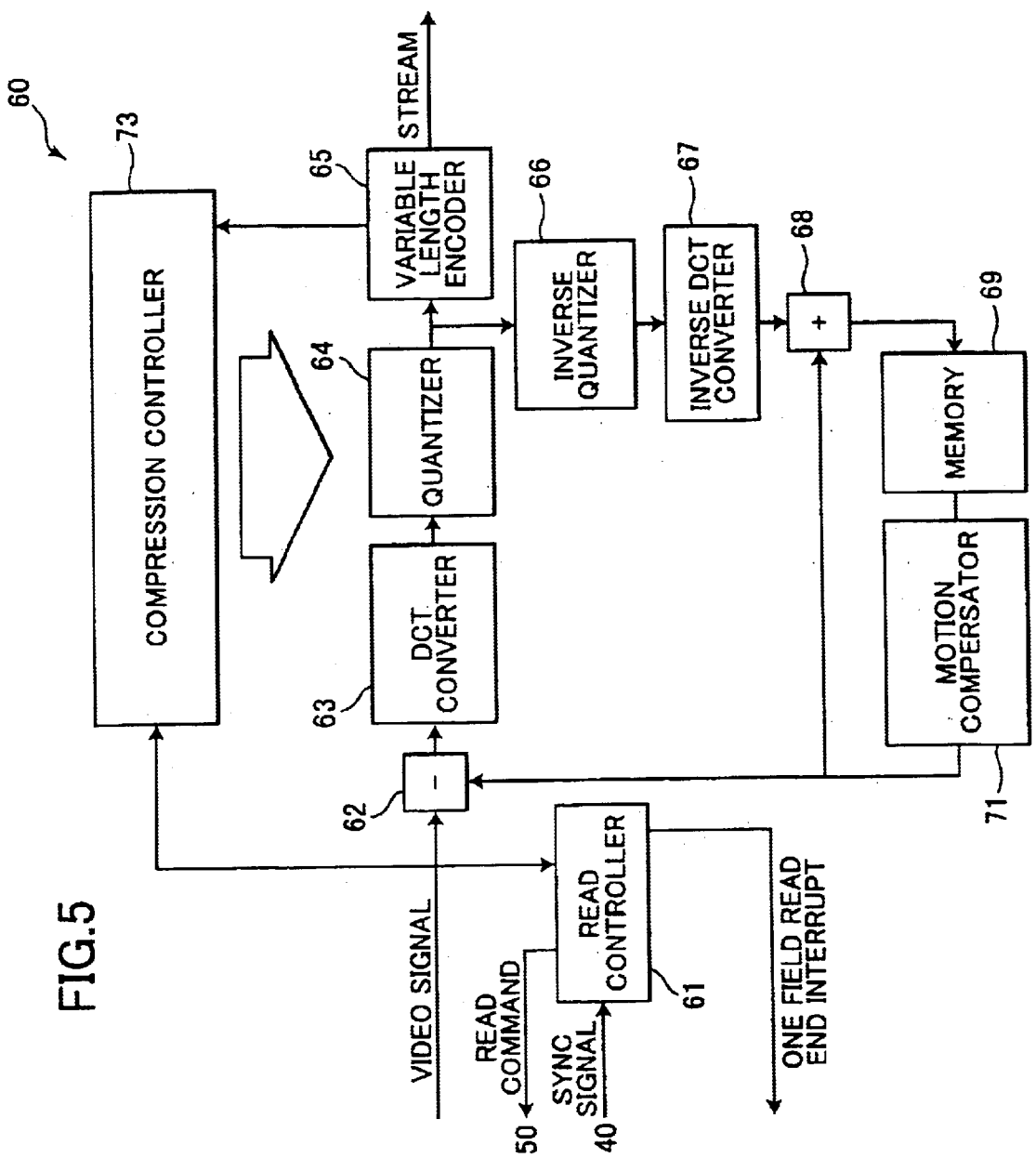
FIG. 5 is a block diagram showing the structure of a compressor for the moving picture data compression device.

As shown in FIG. 5, the compressor 60 is provided with: a read controller 61; a subtractor 62; a DCT converter 63; a quantizer 64; a variable length encoder 65; an inverse quantizer 66; an inverse DCT converter 67; an adder 68; a memory 69; a motion compensator 71; and a compression controller 73.

The read controller 61 in for outputting a read command to the buffer 50 based on a synchronization signal inputted from the switcher 40. The subtractor 62 is for performing subtraction between video signals read from the buffer 50 and reference data which will be described later. The DCT converter 63 is for performing a DCT (discrete cosine) transform process, which is a type of orthogonal transformation. A quantizer 64 is for quantizing DCT coefficient data outputted from the DCT converter 63. The variable length encoder 65 is for variable-long encoding DCT coefficient data that has been converted by the quantizer 64. The inverse quantizer 66 is for converting data converted by the quantizer 64 back into DCT coefficients. The inverse DCT converter 67 is for performing an inverse DCT (inverse discrete cosine transformation) process on DCT coefficient data converted back by the inverse quantizer 66. The adder 68 is for adding motion conpensation to data that has been returned to its original state before DCT processing by the inverse DCT converter 67. The memory 69 is for storing output from the adder 68 for motion compensation estimation. The motion compensator 71 is for estimating a motion compensation based on data stored in the memory 69 and for outputting estimated data as reference data. The compression controller 73 is for controlling entire operations of the compressor 60.

With the above-described structure, the compressor 60 compresses a video signal stored in the buffer 50 and outputs the data as stream 8 in a manner described below.

Video data (moving picture data) that is to be compressed is temporarily stored in the buffer 50. Each time the read controller 61 receives a synchronization signal from the switcher 40, the read controller 61 outputs a read command to the buffer 50 so that the subtractor 62 will read video data stored in the buffer 50. The subtractor 62 also receives reference data (estimation values) from the motion compensator 71 and outputs a difference (estimated error), which is the difference between the video signal and the reference data, to the DCT converter 63.

The DCT converter 63 performs a DCT transform process on the difference data received from the subtractor 62. This process is performed in specified block units. A plurality of numerical coefficients or DCT coefficients are calculated based on these block units. A preset number of DCT coefficient(a) is calculated for each block unit. The DCT converter 63 outputs these coefficients to the quantizer 64 in their order of frequency components. The quantizer 64 converts the DCT coefficients received from the DCT converter 63 at a predetermined step size and outputs the quantizer value to the variable length encoder 65. The variable length encoder 65 determines a significant block and encodes the quantizer DCT coefficient, outputting the encoded data as a stream 8.

The variable-length encoder 65 can first run-length convert the output from the quantizer 64, and then encode the resulting coefficients into a variable-length code. Run-length converting results in a series of pairs of data each pair including the number of successive zero coefficients and a value of a next non-zero coefficient. Since the quantizer 64 tends to output many zero coefficients, performing run-length converting can reduce the amount of data. Then, compression data is created by allocating one variable-length code to each data pair that has been produced through the run-length conversion.

Since DCT coefficients are inputted to the inverse quantizer 66 after being quantized by the quantizer 64, the inverse quantizer 66 inverse quantizes the data using the same step size used by the quantizer 64, calculates the DCT coefficient, and outputs the result to the inverse DCT converter 67. The resulting DCT coefficients contain quantization error. The inverse DCT converter 67 performs an inverse DCS transform process on these DCT coefficients and outputs the result to the adder 68. The adder 68 adds the output from the inverse DCT converter 67 to the output from the movement compensator 71 and outputs the result to the memory 69.

The memory 69 is a frame memory constructed of at least two frames and in used for motion compensation estimation. Simultaneously when data outputted from the adder 68 is stored in the memory 69, data in the previous frame is outputted to the movement compensator 71. Using a process well known in the art using motion vectors, the movement compensator 71 estimates motion compensation on previous frame data inputted from the memory 69 and outputs the result as estimation data to the subtractor 62.

With the above-described compression operation, the compressor 60 can achieve highly efficient data compression by both utilizing the difference in video signals (moving picture data) between successive fields and employing both run-length conversion and variable-length encoding.

When performing compression operations of at least non-realtime data, the compression controller 73 is designed to temporarily halt operations of the entire compressor 60 from the subtractor 62 to the movement compensator 71 every time compression operations for one field have been completed. The state at the completion of the compression operation is maintained until the read controller 61 receives the next synchronization signal. As described already, each time it receives a synchronization signal from the switcher 40, the read controller 61 outputs a read command to the buffer 50, causing data stored in the buffer 50 to be read by the subtractor 62. Further, when all data in the buffer 50 has been read by the subtractor 62, the read controller 61 outputs a one-field read end interrupt to the central calculating processor 23 of the controller 20.

With the above-described structure, the moving picture data compression device 1 operates as described below.

It is noted that the user controls the device 1 from the personal computer 3. That is, when the user desires to change the subject to be compressed between the videotape 5 and the video file 7, the user inputs into the personal computer 3 his/her instruction to switch the subject to be compressed. As a result, the personal computer 3 issues a realtime/non-realtime switch interrupt to the device 1. When the user desires to start compression operation, the user inputs into the personal computer 3 his/her instruction to start compression. As a result, the personal computer 3 issues a compression start command interrupt and the video reception start command to the device 1. When the user desires to end compression operation, the user inputs into the personal computer 3 his/her instruction to end the compression. As a result, the personal computer 3 issues a compression end command interrupt and the video reception stop command to the device 1. It is noted that when the user desires to compress data from the videotape 5, the user controls the video display portion 8 to play the videotape 5 at the playing portion 8a.

The moving picture data compression device 1 operates under control by the arithmetic and program controller 23 in the controller 20 as shown in FIGS. 6–10.

Figure 6:
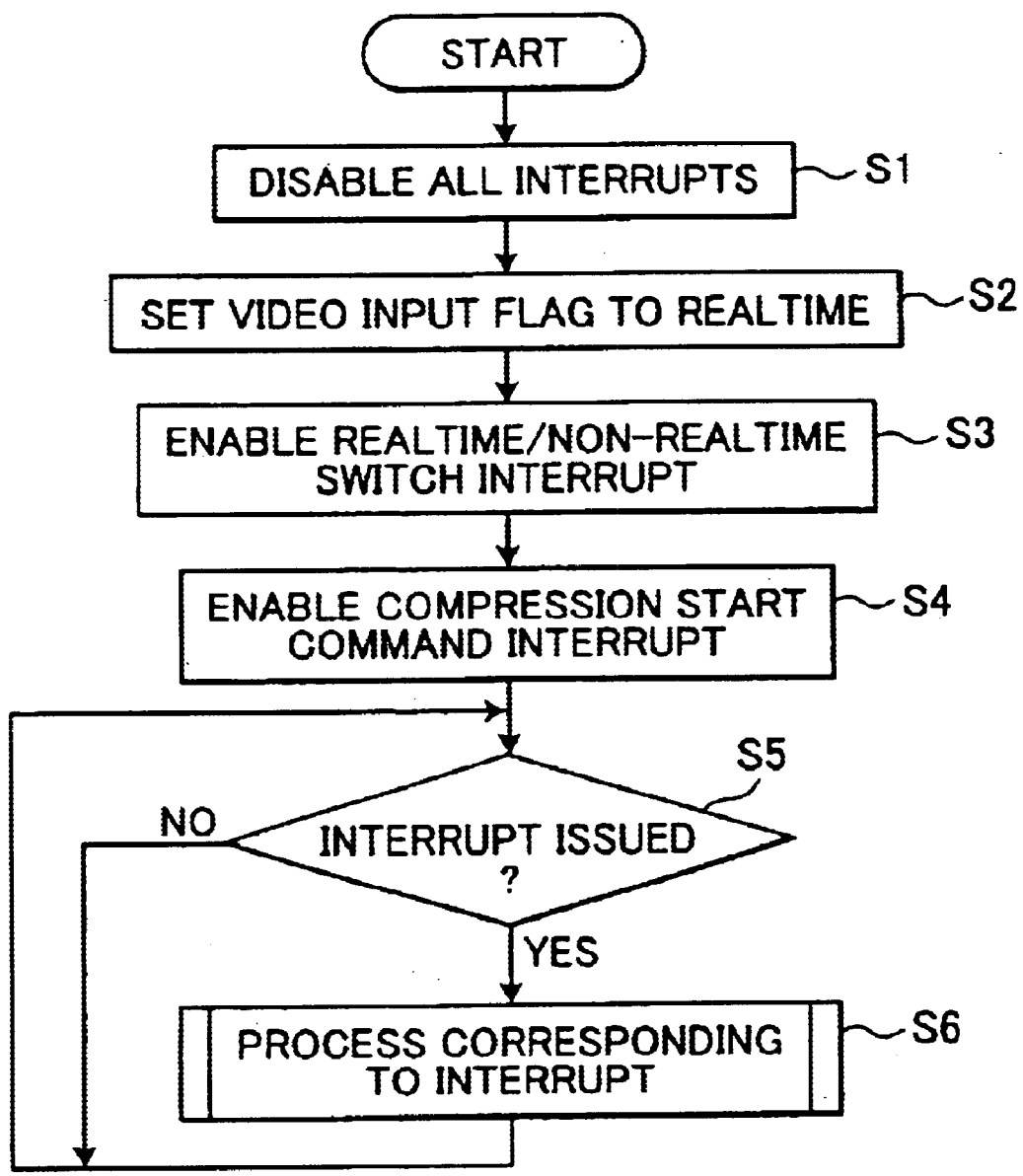
FIG. 6 is a flowchart showing a main routine executed by the controller.

The arithmetic and program controller 23 starts executing a main routine of FIG. 6 when the power of the device 1 is turned on.

As shown in FIG. 5, when the arithmetic and program controller 23 begins its control operations, all interrupts are initially disabled in S1. In S2, a predetermined video input flag is set to "realtime". The video input flag is set by the arithmetic and program controller 23 to represent the state of the switchers 30 and 40. Thus, when the power is switched on, the switchers 30 and 40 are not in S2 to the synchronization signal generator 10 side, that is, the selection to compress realtime data.

In S3 and S4 the arithmetic and program controller 23 enables a realtime/non-realtime switch interrupt and a compression start command interrupt. In S5 the arithmetic and program controller 23 determines whether either interrupt has been issued. If an interrupt has not been issued ("no" in S5), then the arithmetic and program controller 23 waits in a standby state in S5. When an interrupt has been detected ("yes" in S5), a process corresponding to the type of interrupt is executed in S6. Subsequently, the arithmetic and program controller 23 returns to a wait state at S5.

Thus, when the power is switched on, the arithmetic and program controller 23 first executes an initialization process in S1–S4. Subsequently, the arithmetic and program controller 23 waits in an infinite loop at S5 until detecting an interrupt. It is noted that when a prescribed end command is inputted as an interrupt during this infinite loop, then the process in FIG. 5 is ended. When a prescribed reset command is inputted as an interrupt, the arithmetic and program controller 23 executes the initialization processes again from S1.

Figure 7:
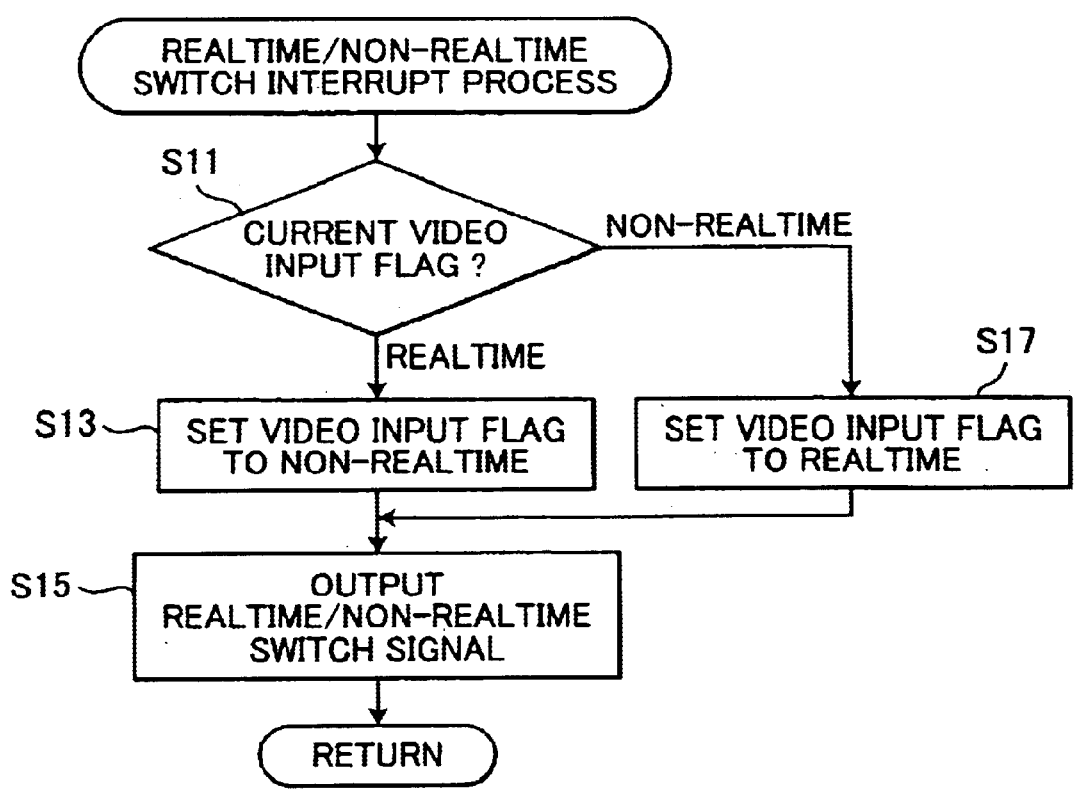
FIG. 7 is a flowchart showing a real-time/non-real-time switch interrupt process executed by the controller.

When the arithmetic and program controller 23 detects a realtime/non-realtime switch interrupt ("yes" in S5), a realtime/non-realtime switch interrupt process shown in FIG. 7 in executed an the process corresponding to the interrupt in S6.

During the realtime/non-realtime switch interrupt process, as shown in FIG. 7, the arithmetic and program controller 23 first determines in S11 the current setting for the video input flag. If the current video input flag is set to realtime, then the program proceeds to S13, in S13 the video input flag is set to non-realtime. In S15 a realtime/non-realtime switch signal is outputted to the switchers 30 and 40. The realtime/non-realtime switch signal corresponds to the newly-set status of the video input flag, and therefore will set the switchers 30 and 40 to the controller 20 side, that is, the selection corresponding to non-realtime data.

On the other hand, If the video input flag is being currently set to non-realtime in S11, than in S17 the video input flag is set to realtime. In S15 a realtime/non-realtime switch signal is outputted to the switchers 30 and 40. The realtime/non-realtime switch signal corresponds to the newly-set status of the video input flag, and therefore will set both the switchers 30 and 40 to the synchronization signal generator 10 side, that in, the selection corresponding to realtime data. In this way, inputting a realtime/non-realtime switch interrupt from the personal computer 3 switches the switches 30 and 40 making it possible to toggle between compressing realtime data and non-realtime data. When the process of S15 is completed, the present routine ends and the process returns to the infinite loop in FIG. 5.

Figure 8:
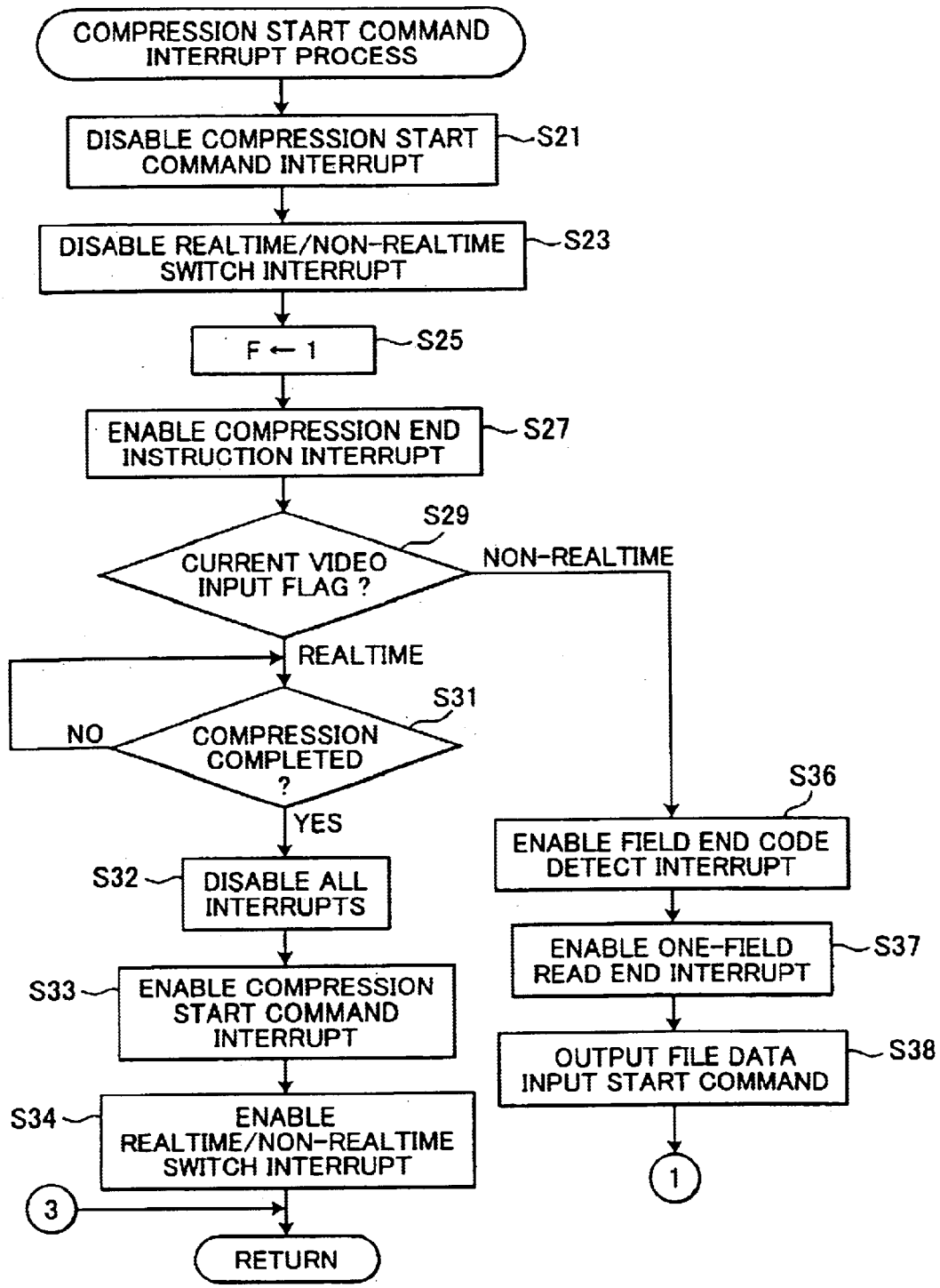
FIG. 8 is a flowchart shoving a portion of a compression start command interrupt process executed by the controller.
Figure 9:
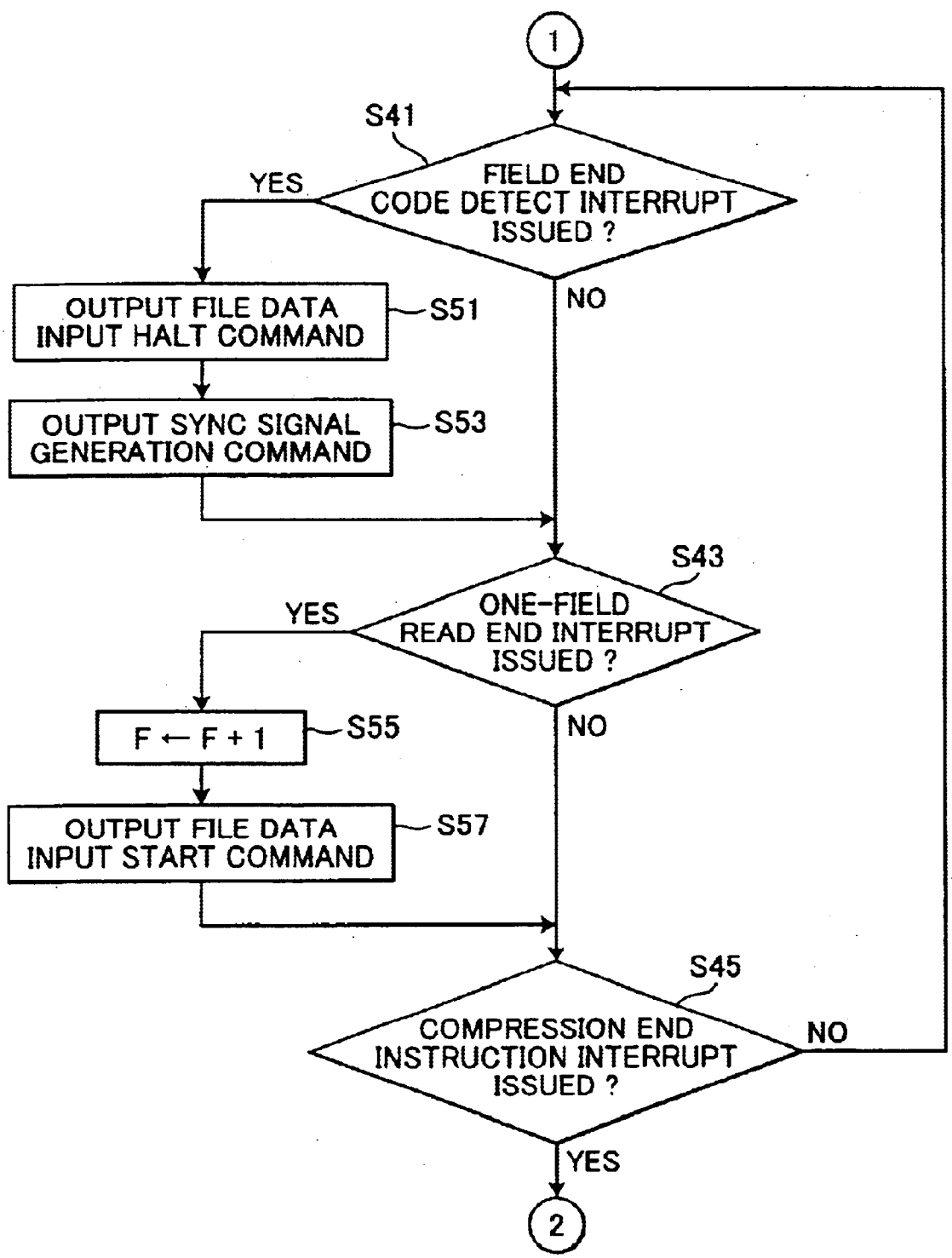
FIG. 9 in a flowchart showing another portion of the compression start command interrupt process executed by the controller.
Figure 10:
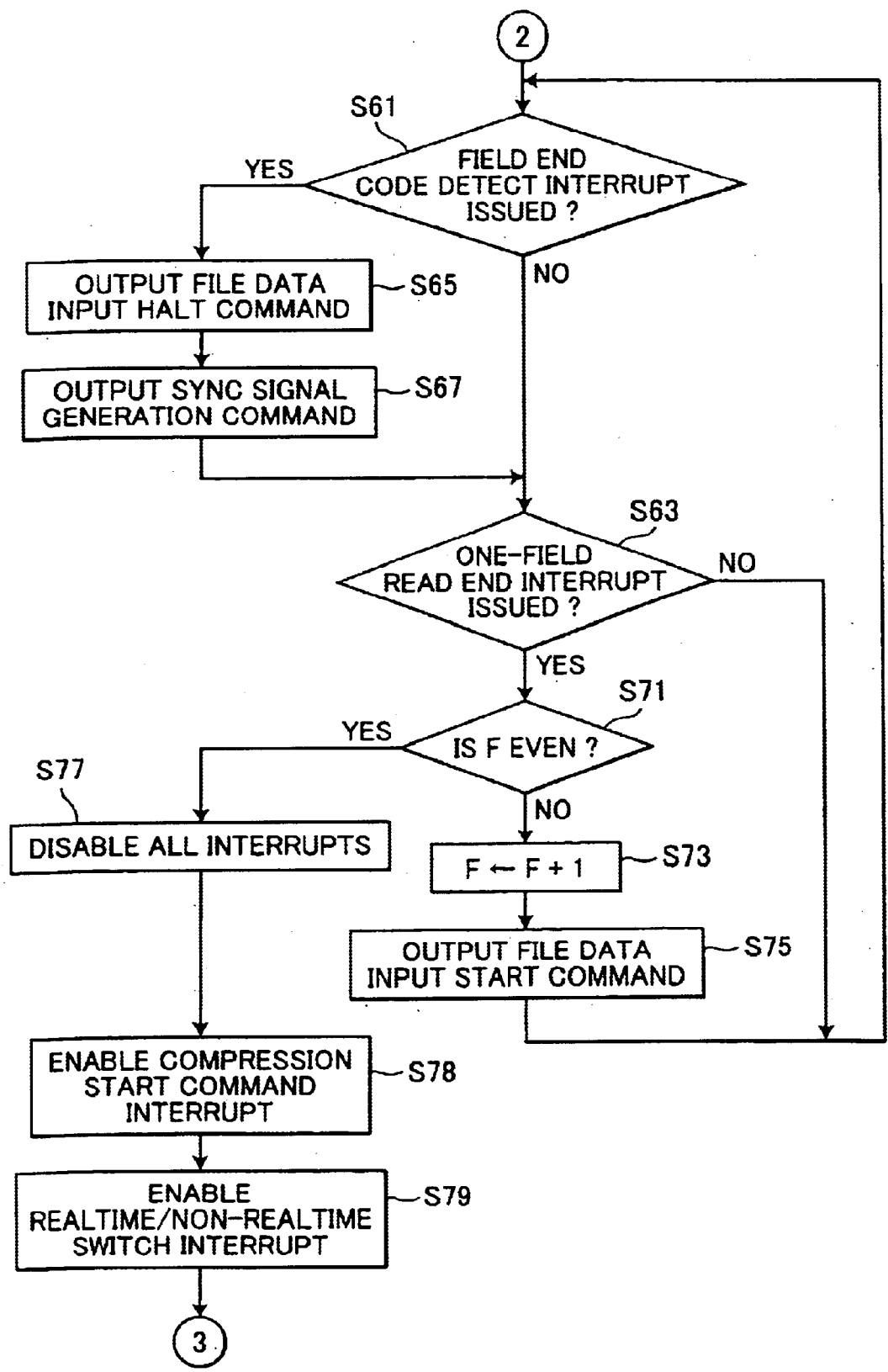
FIG. 10 is a flowchart showing a remaining portion of the compression start command interrupt process executed by the controller.

When a compression start command interrupt is detected in S5 ("yes" in S5), a compression start command interrupt process corresponding to this interrupt, shown in FIGS. 8–10, in executed as S6.

During the compression start command interrupt process as shown in FIG. 8, in S21 and S23 both the compression start command interrupt and the realtime/non-realtime switch interrupt are first disabled. Then, in S25 a variable F for counting the number of fields, described later, is set to one (1). In S27 the compression end command interrupt is enabled. Next, in S29 the arithmetic and program controller 23 determines the current video input flag. If the current video input flag is realtime, then S31 is processed next.

It is noted that simultaneously when the personal computer 3 issues the compression start command interrupt to the controller 20, the personal computer 3 also issues a video reception start command to the video signal receiving portion 11. Accordingly, the video signal receiving portion 11 starts receiving successive fields' worth of digital video signals from the videotape playing portion 8a. The video signal receiving portion 11 converts the digital video signals into digital video data, and outputs the digital video data to the synchronization signal generator 10. Receiving the digital video data, the synchronization signal generator 10 outputs successive fields' worth of video data to the switcher 30 and outputs successive top/bottom field start codes as synchronization signals to the switcher 40. The successive fields' worth of video data pass through the switcher 30 to be stored in the buffer 50. The successive synchronization signals pass through the switcher 40 to be inputted to the read controller 61 in the compressor 60. Each time a synchronization signal is thus received by the read controller 61, the read controller 61 outputs a read command to the buffer 50 so that the subtractor 62 retrieves one field's worth of video data from the buffer 50. Thus, the compressor 60 executes compression operation onto the successive fields' worth of video data read from the videotape 5. The compressor 60 continues executing compression operation until the compressor 60 receives no video data from the video signal receiving portion 11.

In S31, the arithmetic and program controller 23 determines whether the compressor 60 has ended compression operations, and waits until the compression operation has been ended. Thus, the controller 20 need not perform any special control operations onto the compressor 60 to compress realtime data. Hence, the controller 20 simply monitors the state of the compressor 60 in S31, and waits in a standby state until the compression operation is completed.

It is noted that the arithmetic and program controller 23 may forcibly and the compression operations of the compressor 60 by inputting an end command to the compression controller 73, in response to a compression end command interrupt that is inputted from the personal computer 3 during realtime data compression. In this case, the compression controller 73 has to perform a prescribed ending process in order to monthly end the compression operation.

When the compression process for realtime data has ended ("yes" in S31), all interrupts are disabled in S32. In S33 and S34 the compression start command interrupt and realtime/non-realtime switch interrupt, respectively, are enabled. The process then returns to the loop at S5. By executing the processes from S32 to S34, the moving picture data compression device 1 is returned to its original initialized-state similar to when the power is first switched on.

on the other hand, when the video input flag in set to non-realtime when the compression start command interrupt process in executed, the program proceeds from S29 to S36. In S36, the field end code detect interrupt is enabled. Then, in S37, the one-field read end interrupt is enabled. Next, in S38, the arithmetic and program controller 23 outputs a file data input start command to the file data input switch 21 instructing the file data input switch 21 to start inputting video data from the file reading portion 13. As a result, the file data input switch 21 instructs the file reading portion 13 to start its operation to read information from the video file 7 and to output digital video data to the file data input switch 21. The file data input switch 21 supplies the received video data to the field and code separator 22.

Next, as shown in FIG. 9, the arithmetic and program controller 23 determines in S41 whether a field end code detect interrupt has been issued from the field end code separator 22; determines in S43 whether a one-field read end interrupt has been issued from the compressor 60; and determines in S45 whether a compression end command interrupt has been issued from the personal computer 3, in that order. If none of the above interrupts are detected ("no" in S41, S43, and S45), then the processes in S41–S45 are repeated in a standby state until an interrupt is detected.

It is noted that as described above, when the arithmetic and program controller 23 issues a file data input start command to the file data input switch 21 in S38, the file data input switch 21 starts supplying non-realtime data to the field end code separator 22. The field end code separator 22 outputs one field worth of non-realtime video data to the switcher 30. Subsequently, the field end code separator 22 outputs a field end code detect interrupt to the arithmetic and program controller 23. Accordingly, the positive judgment In S41 in normally first occurred during the loop of S41–S45.

When the arithmetic and program controller 23 detects the field end code detect interrupt in S41 (yes in S41), the process exits the loop of S41–S45, and performs processes of S51 and S53. In S51, the arithmetic and program controller 23 outputs a file data input halt command to the file data input switch 21. An a result, the file data input switch 21 instructs the file reading portion 13 to halt its reading-and-outputting operation. Thus, the file data input switch 21 stops supplying video data to the field and code separator 22. In S53, the arithmetic and program controller 23 outputs a synchronization signal generation command to the synchronization signal generator 24, thereby instructing the synchronization signal generator 24 to generate a synchronization signal. Control returns to the standby loop of S41–S45.

Thus, after one field worth of non-realtime data is outputted to the switcher 30, input of non-realtime data is halted by the file data input switch 21 in S51. Next, the synchronization signal generator 24 outputs a synchronization signal in response to the synchronization signal generation command (S53). The synchronization signal in inputted via the switcher 40 to the compressor 60. When receiving this synchronization signal, the read controller 61 in the compressor 60 commands one field worth of video data to be read from the buffer 50 and supplied to the subtractor 62 to begin a compression operation. After the compressor 60 has read all of the one field worth of video data, the compressor 60 issues a one-field read and interrupt.

When the arithmetic and program controller 23 receives a one-field read end interrupt ("yes" in S43), the variable F in incremented by one (1) in S55. In S57 the arithmetic and program controller 23 again outputs a file data input start command to the file data input switch 21. Subsequently, the process returns to the loop from S41 to S45. At this time, non-realtime data input is restarted, as when the process of S38 has been executed to enter the current loop. Normally, repeatedly executing the processes from S41 to S57 enables the moving picture data compression device 1 to compress non-realtime data one field at a time in sequential order by repeatedly inputting one field worth of non-realtime data (S57) and providing the corresponding data to the compressor 60 (S53).

When a compression end command interrupt is inputted from the personal computer 3 ("yes" in S45), the process moves to S61 in FIG. 10.

As shown in FIG. 10, in S61 the arithmetic and program controller 23 determine whether a field and code detect interrupt has been issued. If this interrupt has not been issued ("non" in S61), then the arithmetic and program controller 23 determine in S63 whether a one-field read end interrupt has been issued. If this interrupt has not been issued ("no" in S63), then the process loops back to S61.

If a compression and command interrupt is issued ("yes" in S45) while the file reading portion 13 is outputting non-realtime data to the controller 20, the positive judgement in S61 will be first occurred during the loop of S61–S63. As a result, similarly to S51 and S53 described above, the arithmetic and program controller 23 outputs a file data input halt command in S65 and outputs a synchronization signal generation command in S67. The process returns to the loop of S61 and S63. With these steps, the compressor 60 begins to read video signal.

After the compressor 60 begins to read video signal for compression (S67) according to the above-described method, a one-field read end interrupt will be issued ("yes" in S63). It is noted that the positive judgment of S63 will possibly be first occurred during the loop of S61–S63 if the compression end command interrupt in issued ("yes" in S45) while the compressor 60 is reading video signal for compression.

After the positive judgement of S63, the program proceeds to S71. In S71 the arithmetic and program controller 23 determines whether the variable F is currently an even number. As described already, each frame's worth of non-real-time data 200 is configured from a pair of top field video data 201 and bottom field video data 203. For this reason, if F is odd, It is known that the other part of the video data has not yet been read.

Hence, it the variable F is odd ("no" in S71), then the variable F is incremented in S73, and the arithmetic and program controller 23 again outputs a file data input start command in S75 no that one more field worth of video data be read for compression. The process returns to the loop of S61 and S63. When one field worth of non-realtime data has been inputted ("yes" in S61), the video data is again read into the compressor 60 in S67.

When reading of this video data has been completed ("yes" in S63), the process returns again to S71. At this time, F is an even number ("yes" in S71), so the program proceeds to S77. It in noted that if F is an even number at the timing when the process of S71 is first executed, the program directly proceeds to S77 without executing the processes of S73–S75.

In S77 all interrupts are disabled. In S78 and S79 the compression start command interrupt and realtime/non-realtime switch Interrupt are enabled. The process then returns to the loop at S5. According to the processes S77–S79, the moving picture data compression device 1 is brought into the standby state where the same interrupts are enabled as when the device 1 is initialized after being powered on.

It is noted that the arithmetic and program controller 23 will possibly detect a data and of the non-realtime data during the processes of FIG. 9 if the non-realtime data, inputted from the video file 7, is short. In this case, the process of S77 may be executed immediately after the one-field read end interrupt has been inputted last from the compressor 60 ("yes" in S43).

It is noted that the compression controller 73, provided in the compressor 60, enables the compressor 60 to halt all components temporarily after a compression operation for one field of data has been completed until the next synchronization signal is inputted in S53 or in S67. It is noted that the synchronization signal generator 24 generates synchronization signals based on the timing how successive sets of video data are supplied from the video file 7 to the compressor 60. Accordingly, the synchronization signals, generated based on the non-realtime data, are not always generated at a uniform interval. In this respect, the compression controller 73 enables the compressor 60 to stop its operations temporarily after a compression operation for one field of data has been completed. Accordingly, the compressor 60 can perform an extremely accurate compression operation. More specifically, by temporarily halting compression operations to calculate the difference between successively-received sets of moving picture data, it is possible to prevent data from changing when a synchronization signal in delayed and to avoid generating an error when no moving picture data, to be subjected to the difference calculation, is inputted and therefore the difference cannot be calculated by the subtractor 62. Accordingly, the moving picture data compression device 1 can reliably and accurately perform compression operations onto non-realtime data.

An described above, when a realtime/non-realtime switch interrupt is received from the personal computer 3, the controller 20 outputs a realtime/non-realtime switch signal to both the switchers 30 and 40 to change the type of data being compressed, that 18, whether realtime data recorded on the videotape 5 is to be compressed or non-realtime data recorded on the video file 7 is to be compressed. Hence, it is possible to reliably compress the user'a desired type of data.

When compressing non-realtime data, the controller 20 supplies one field worth of video signal to the buffer 50 and subsequently sends a synchronization signal to the compressor 60 instructing the compressor 60 to read that data, when a one-field read end interrupt indicating the and of the current read is issued from the compressor 60, the net field of data is supplied to the buffer 50. In this way, the device 1 can compress non-realtime data easily. Compression of realtime data, on the other hand, can be performed without the control by the controller 20. Hence the moving picture data compression device 1 can easily and reliably compress both realtime and non-realtime data, offering a wide variety of applications such as communications.

It is noted that the user will possibly desire to compress data from both the videotape and the video file 7 and to combine them together. In this case, the user controls the video player portion 8 to continuously play realtime data from the videotape 5. The device 1 can receive realtime data from the videotape 5 and non-realtime data from the video file 7 simultaneously. The user manipulates the personal computer 3 to repeatedly issue realtime/non-realtime switch interrupts at his/her desired timings. In response to the realtime/non-realtime switch interrupts, the controller 20 can, at the user's desired timings, switch which data is to be compressed and subsequently link the data together, enabling a wide variation of editing effects. It is noted that when switching the type of data to be compressed, it is necessary to input a compression end command interrupt first to end the current compression operation.

Second Embodiment

Next a moving picture data compression device 1 according to a second embodiment of the present invention will be described with reference to FIGS. 11–17.

Figure 11:
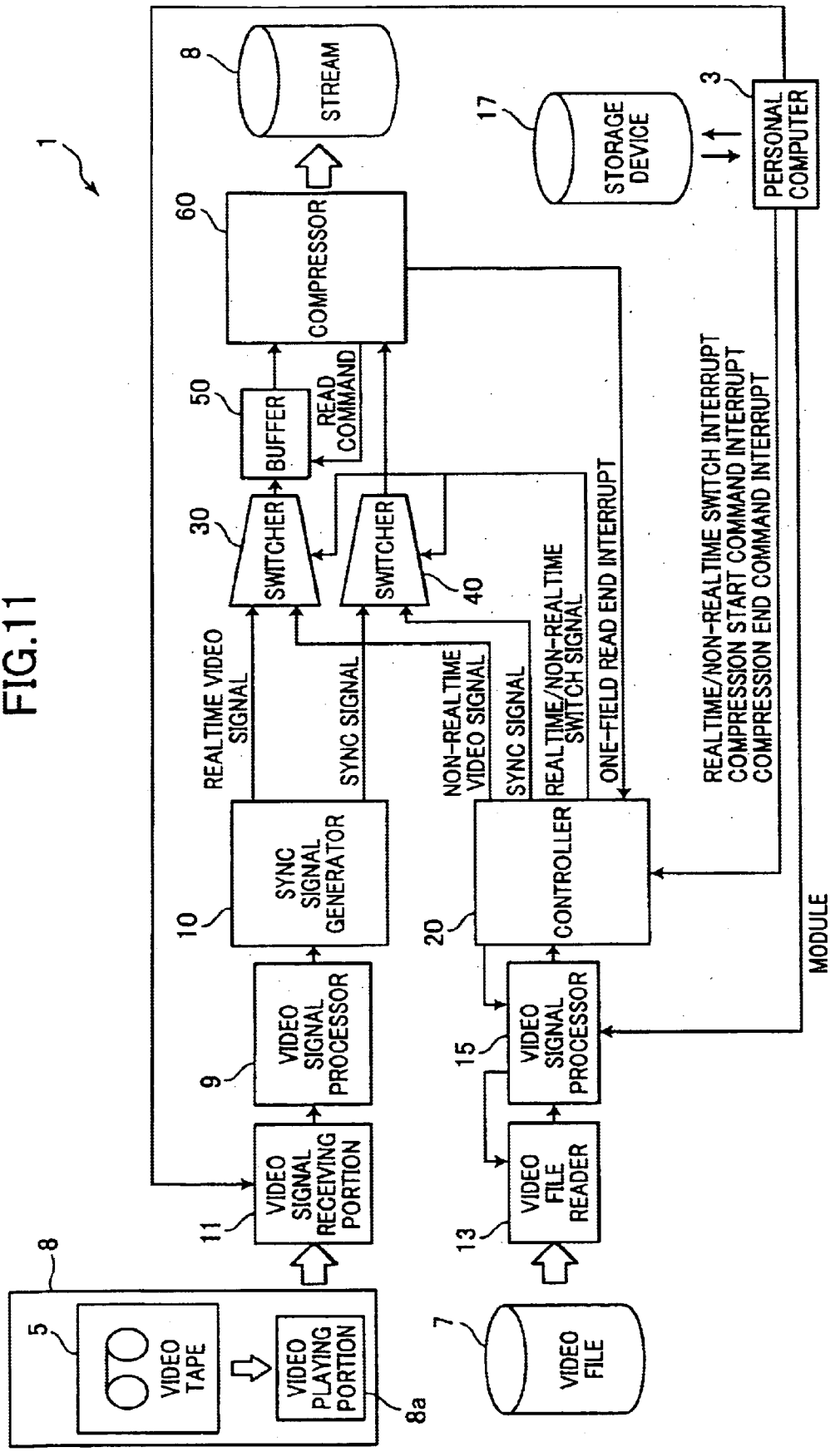
FIG. 11 is a block diagram showing the structure of a moving picture data compression device according to a second embodiment of the present invention.

As shown in FIG. 11, the moving picture data compression device 1 of the present embodiment is the same as that of the first embodiment except that a video signal processor 9 is provided between the video signal reception portion 11 and the synchronization signal generator 10, and that another video signal processor 15 is provided between the file reading portion 13 and the controller 20.

Figure 12:
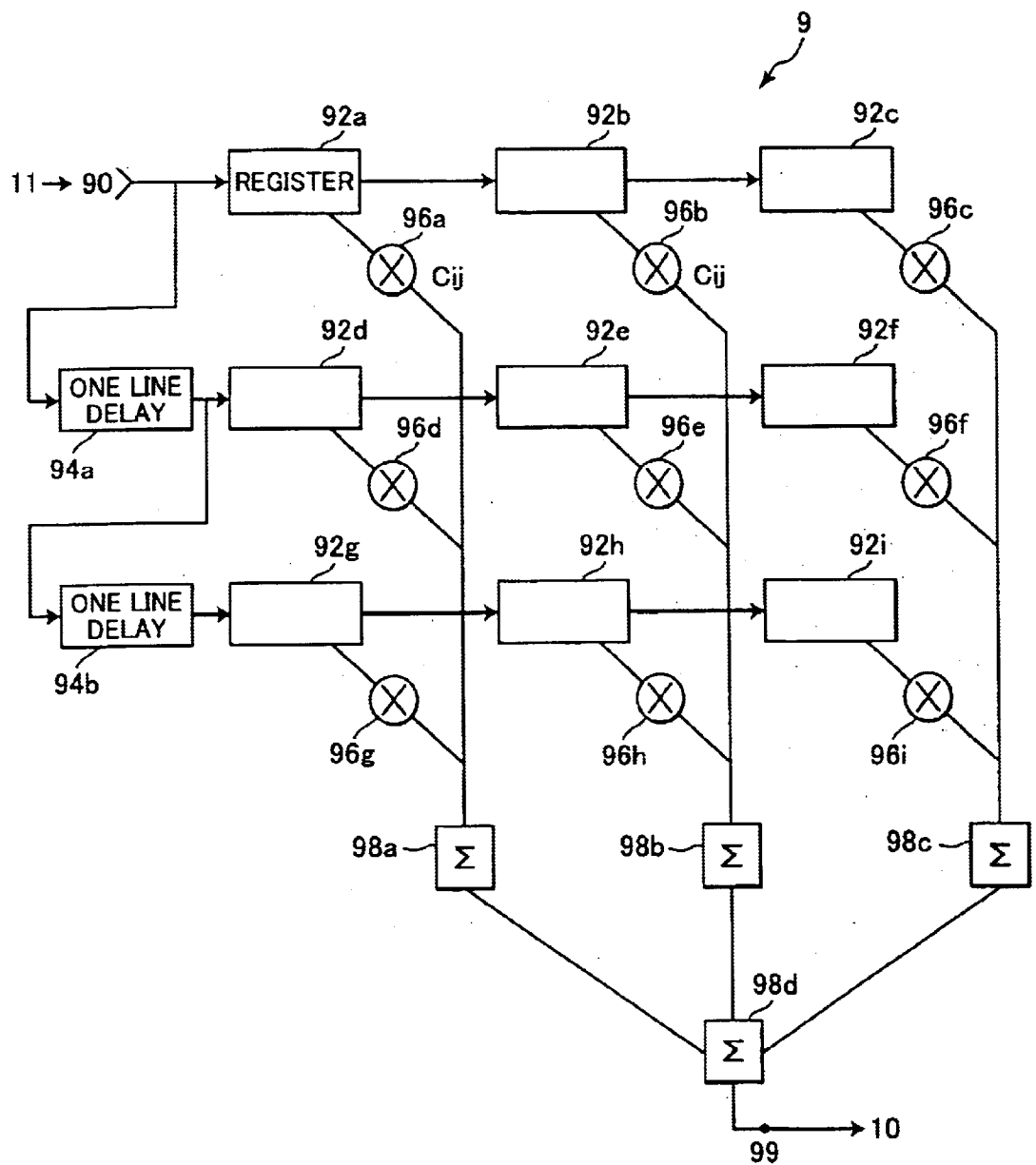
FIG. 12 in a circuit diagram of a video signal processor in the moving picture data compression device of FIG. 11.

The video signal processor 9 is connected to the video signal receiving portion 11 and the synchronization signal generator 10. The video signal processor 9 in for receiving digital video data from the video signal reception portion 11, for performing various editing operation onto the digital video data, and then outputting the edited digital video data to the synchronization signal generator 10. The video signal processor 9 is an editing mechanism well known in the art for performing such processes as noise reduction and gamma correction on realtime data. For example, the video signal processor 9 may be constructed as a filter. In this case, as shown in FIG. 12, the video signal processor 9 may be constructed from: a digital video data input 90 connected to the video signal receiving portion 11; a plurality of registers 92a–92i; a pair of one-line delay 94a and 94b; a plurality of coefficients (Cij) 96a–96i; several multiplication circuits 98a–98d; and an edited digital video data output 99 connected to the synchronization signal generator 10.

The video signal processor 15 in connected to the video file reader 13 and to the controller 20. The video signal processor 15 is for receiving digital video data from the file reading portion 13, for executing a variety of conversion processes on the non-realtime data, and for outputting the converted non-realtime data to the controller 20.

Figure 13:
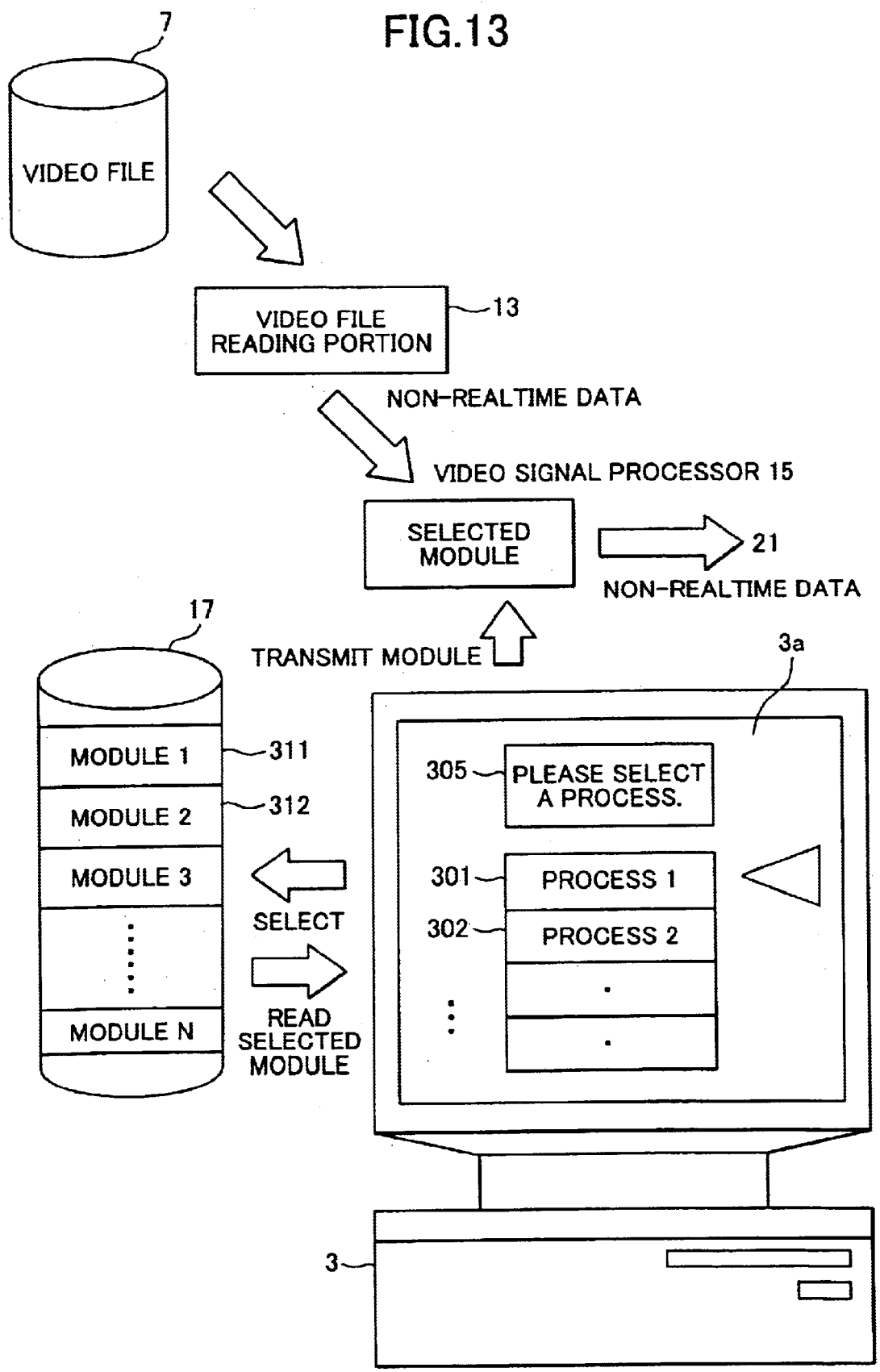
FIG. 13 is an explanatory diagram showing the operations performed by the video signal processor according to the second embodiment.

The video signal processor 15 is connected also to the personal computer 3. According to the present embodiment, the personal computer 3 is connected to a storage device 17. As shown in FIG. 13, the storage device 17 is prestored with data of a plurality of computer progress or modules 311, 312, . . . . The personal computer 3 serves to read a user's selected computer program from the storage device 17, and transfers the read-out module to the video signal processor 15. The video signal processor 15 stores the module therein, and executes conversion processes onto non-realtime data, inputted from the file reading portion 13, based on the module. The video signal processor 15 outputs the thus converted digital video data to the file data input switch 21 in the controller 20 (FIG. 3).

More specifically, the video signal processor 15 starts its data processing operation In response to a read start command issued from the file data input switch 21. That is, when receiving the read start command, the video signal processor 15 instructs the file reading portion 13 to read video data from the video file 7. The video signal processor 15 receives video data from the file reading portion 13. The video signal processor 15 affects conversion processes on the non-realtime data based on the module presently stored therein. The video signal processor 15 then outputs the Converted non-realtime data to the controller 20. The video signal processor 15 stops or halts its data processing operation in response to a read halt command issued also from the file data input switch 21. That is, when receiving the read halt command, the video signal processor 15 instructs the file reading portion 13 to stop reading video data from the video file 7. The video signal processor 15 completely ends the processing operation when the video signal processor 15 is instructed by the personal computer 3 to end the processing operation. It in noted that the personal computer 3 instructs the video signal processor 15 to end the processing operation simultaneously when the computer 3 issues a compression end command interrupt to the controller 20.

Thus, the video signal processor 15 is capable of executing a variety of conversion processes on the non-realtime data, based on the modules or computer programs stored in the storage device 17, under control by the personal computer 3. Accordingly, by providing the video signal processor 15 upstream from the controller 20. It is possible to execute various editing operations on non-realtime data before compression.

The structure and operations of the video signal processor 15 will be described below in greater detail with reference to FIGS. 13–17.

As shown in FIG. 13, the storage device 17 is prestored with the plurality of modules or small-sized computer programs 311, 312, . . . for respectively executing a plurality of different processing onto non-realtime video data. Representative examples of processes performed by the modules 311, 312, . . . include: a filtering process, a time elapse process, a rewind process, a logo insertion process, a noise reduction process, a brightness adjustment process, a graduation process, a gamma correction process, a fade in process, a fade out process, and the like.

Figure 14:
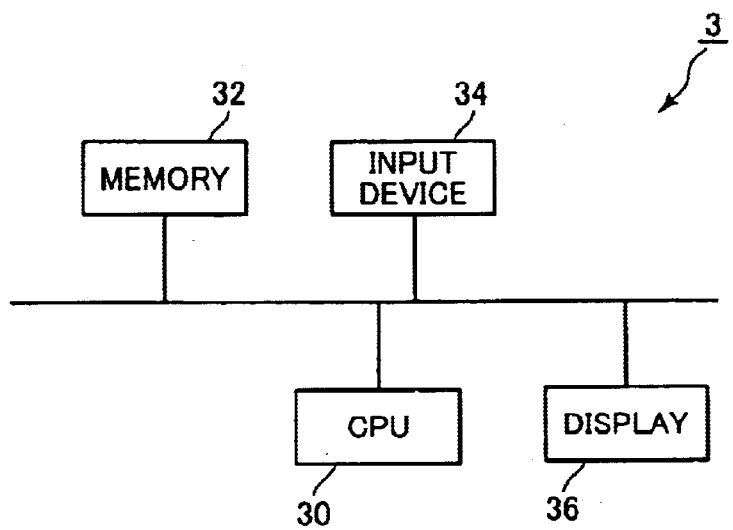
FIG. 14 is a block diagram of a personal computer connected to the moving picture data compression device.

As shown in FIG. 14, the personal computer 3 is provided with: a CPU 30, a memory device 32 such as a ROM and a RAM, an input device 34 such as a keyboard and a mouse, and a display 36. The memory device 32 is prestored with an application program for executing non-realtime data editing operation. When the user manipulates the input device 34 to start the non-realtime data editing application, the display 36 is controlled to display a scream 3a (FIG. 13) for displaying a plurality of icons 301, 302, . . . that respectively correspond to the modules 311, 312, . . . stored in the storage device 17. The screen 3a also displays a message 305 instructing the user to "Please select a process." This screen 3a therefore enables the user to select his/her desired processes among the plurality of modules 311, 312, . . . stored in the storage device 17.

When the user either clicks a mouse 34 on one icon that corresponds to his/her desired process or inputs the name ("process 1", "process 2", . . . in this example) of his/her desired process from the keyboard 34, the personal computer 3 reads, from the storage device 17, one module that corresponds to the user's selected process. The personal computer 3 transfers the read-out module to the video signal processor 15, while instructing the video signal processor 15 to write the module therein. As a result, the video signal processor 15 stores the module therein.

It is noted that after selecting his/her desired processes, the user inputs, at this/her desired timing, the personal computer 3 with his/her instruction to start compressing video data from the video file 7. As a result, the personal computer 3 outputs a compression start command interrupt to the controller 20. The file data input switch 21 outputs a read start command to the video signal processor 15, whereupon the video signal processor 15 controls the video file reading portion 13 to read video data from the video file 7 and to supply the video data to the video signal processor 15. The video signal processor 15 processes the video data based on the module stored therein.

Figure 15:
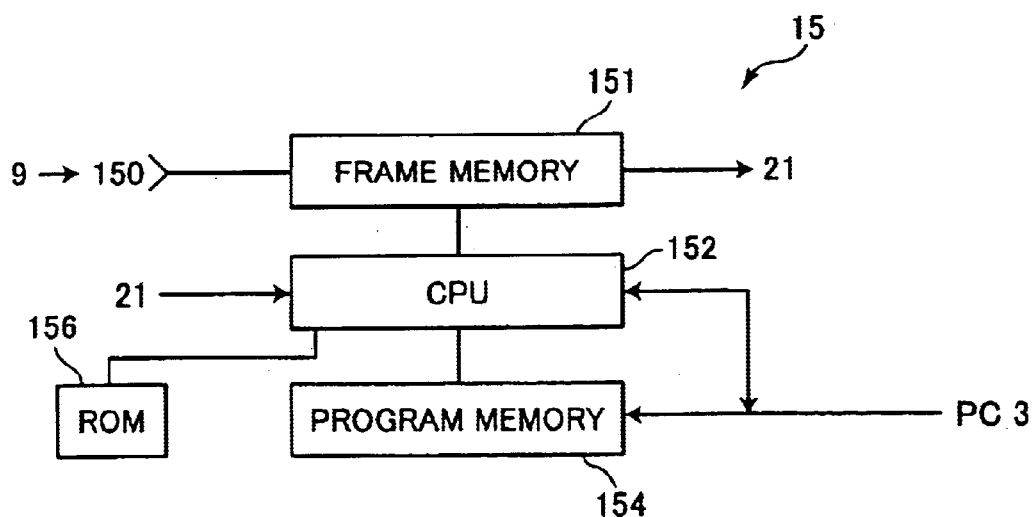
FIG. 15 is a block diagram of the video signal processor.
Figure 16:
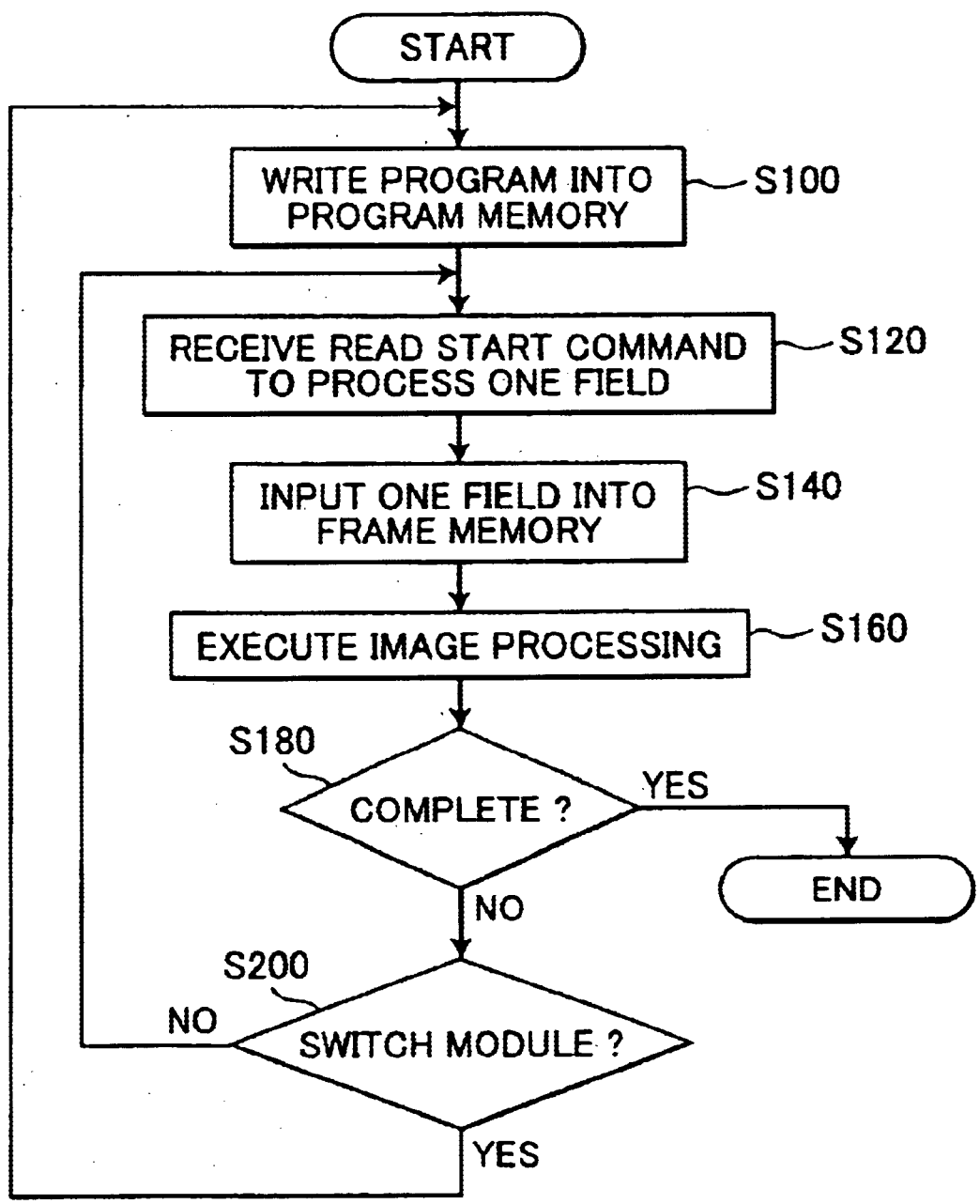
FIG. 16 is a flowchart showing a video processing operation executed by the video signal processor according to the second embodiment.

As shown in FIG. 15, the video signal processor 15 is constructed from a well-known microcomputer. That is, the video signal processor 15 includes: a CPU 152, a ROM 156, and a RAM 151. The video signal processor 15 in also provided with a program memory 154. The program memory 154 may be constructed from a non-volatile RAM (NVRAM). A flash ROM can also be used as the program memory 154. The RAM 151 serves as a frame memory for temporarily storing one field's worth of video data inputted from the file reading portion 13. The ROM 156 in prestored with data of a module storing-and-executing program whose flowchart is shown in FIG. 16. The CPU 152 is for controlling the entire processor 15 through executing the module storing-and-executing program stored in the RON 156. The CPU 152 receives instructions from the personal computer 3 and from the file data input switch 21. The program memory 154 is for receiving and storing data of a program (module) transferred from the storage device 17.

it is noted that according to the present embodiment the controller 20 (FIG. 3) executes the operation of FIGS. 6–10 in the same manner as in the first embodiment.

That is, when the personal computer 3 issues the compression start command interrupt, the file date input switch 21 receives a file data input start command that is issued in S38 (FIG. 8) from the central arithmetic and program controller 23. As a result, in order to initiate the input of non-realtime data, the file data input switch 21 supplies a read start command to the video signal processor 15 so that the video signal processor 15 will instruct the file reading portion 13 to supply video data from the video file 7 to the video processing portion 15 and so that the video processing portion 15 will execute a process, corresponding to the module presently stored in the program memory 154, onto the non-realtime data supplied from the video file 7 and to supply the result to the file data input switch 21. The data thus supplied to the file data input switch 21 is compressed by the compressor 60 in the same manner as in the first embodiment through the processes of FIGS. 6–10.

It in noted that after inputting his/her instruction to start compression operation, the user can select another module, different from that he/she has first selected, through executing the non-realtime data editing application on the personal computer 3. In this case, the personal computer 3 instructs the video signal processor 15 to switch the presently-stored module with a newly-selected module. The personal computer 3 reads out the newly-selected module from the storage device 17, and transfers the module to the video signal processor 15. The CPU 152 in the video signal processor deletes the current module, already stored in the program memory 154, and writes the now module in the program memory 154.

The operation of the video processing portion 15 will be described below in greater detail. In the video processing portion 15, the CPU 152 executes the module storing-and-executing program, shown in FIG. 16, thereby performing video processing operation.

That is, first in S100, the CPU 152 receives data of the module transferred from the personal computer 3, and writes the module data in the program memory 154. In S120, the CPU 152 receives a read start command from the file data input switch 21. It is noted that the read start command is issued from the file data input switch 21 in response to a file data input start command that is issued from the arithmetic and program controller 23 in S38, S57, or S75. In response to the read start command, the CPU 152 instructs the file reading portion 13 to read one field's worth of video data from the video file 7.

Then, In S140, the CPU 152 receives one field's worth of video data from the file reading portion 13 and stores the video data in the frame memory 151. In S160, the CPU 152 performs image processing onto the one field's worth of video data according to the module that is presently being stored in the program memory 154.

Then, the CPU 152 judges in S180 whether or not an instruction to end the processing is received from the personal computer 3. When the CPU 152 receives a process end instruction from the personal computer 3 (yes in S180), the process ends. On the other hand, when the CPU 152 has not received a process and instruction (no in S180), the CPU 152 judges in S200 whether or not the CPU 152 receives an instruction, from the personal computer 3, to switch the present module with a new module. If not (no in S200), the processing corresponding to the urn module is repeated onto subsequent field(s). On the other hand, if the module switching instruction in received from the personal computer 3 (yes in S200), the module newly transferred from the personal computer 3 is written over the already-stored module in S100, and then processing corresponding to the new module will be performed onto the subsequent field(s) in the processes of S120–S200.

Following will be given a detailed description how the processor 15 processes video data through the processes of S120–S200 according to a module that is transferred from the personal computer 3.

Figure 17:
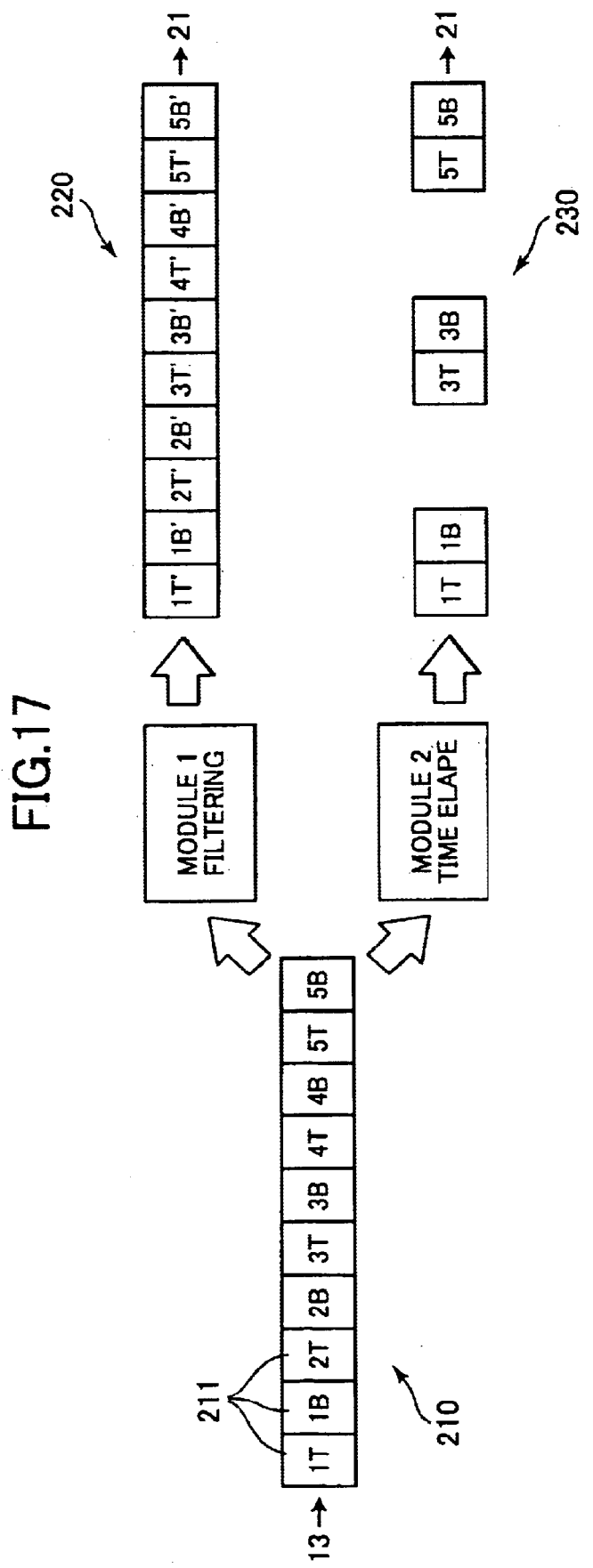
FIG. 17 is an explanatory diagram showing how non-realtime data is processed by the video signal processor according to the second embodiment.

It is noted that non-realtime data 210 read by the file reading portion 13 from the video file 7 is constructed as shown in FIG. 17. As shown in the diagram, the data 210 read by the file data reading portion 13 is composed of a plurality of sets of data 211 that are ordered according to a time series. That is, a top field 1T of first frame, a bottom field 1B of first frame, a top field 2T of second frame, a bottom field 2B of second frame, . . . , and a top field 5T of fifth frame and a bottom field 5B of fifth frame are arranged in this order in this example.

It is now assumed that the user selects "module 1", for example, to indicate a filtering process. In this case, data of the "module 1" in read by the personal computer 3 from the storage device 17 and is transferred from the personal computer 3 to the video signal processor 15 in S100. In the loop of S120–S200, the video signal processor 15 performs filtering operation onto the data 211, and inputs the result to the file data input switch 21 in a manner described below.

The video signal processor 15 performs filtering operation onto each field 1T', 1B', . . . , and 5B in the data 211 to form a filtered data array 220 constructed from filtered fields 1T', 1B', . . . , and 5B'. The video signal processor 15 outputs the data array 220 to the file data input switch 21. Accordingly, the filtered non-realtime data is inputted into the compressor 60, where it is compressed and outputted as a stream 8. By playing the output stream B on a decoder well known in the art, a filtering-processed video in played.

It is assumed that the user selects "module 2", for example, to indicate a time elapse process. In this case, data of the "module 2" is read by the personal computer 3 from the storage device 17 and is transferred to the video signal processor 15 in S100. In the loop of S120–S200, the video signal processor 15 changes the arrangement of the data 211 and inputs the result to the file data input switch 21 in a manner described below.

The video signal processor 15 skips data 211 for every other frame and outputs the resulting data into the file data input switch 21. In other words, the video signal processor 15 outputs the top and bottom fields 1T and 1B of first frame, top and bottom fields 3T and 3B of third frame, and top and bottom fields 5T and 5B of fifth frame, —as indicated by a data 230 shown in FIG. 17. The compressor 60 compresses the resulting data and outputs the result as a stream 8. When the stream 8 is played on a decoder well known in the art, the data appears to be fast-forwarded as if the passage of time has been accelerated.

As described above, according to the moving picture data compression device 1 of the present embodiment, the storage device 17 stores therein the plurality of modules 311, 312, . . . corresponding to Process 1, Process 2, . . . When the user uses the mouse to click on an icon 301, 302, . . . corresponding to his/her desired processes or enters the name of his/her desired process using the keyboard, the module corresponding to the selected process (rewind, time lapse, and the like) is read out from the storage device 17, and is transferred to the video signal processor 15. The video signal processor 15 stores the module, and performs processes corresponding to the selected module onto non-realtime data read from the video file 7, with the result being inputted into the compressor 60. Accordingly, the user's desired editing processes can be performed on non-realtime data without connecting additional editing equipment to the device 1.

Since the processes are executed directly on non-realtime data, it in unnecessary to convert non-realtime data to realtime data and store the realtime data on a video tape 5 or the like. Therefore, it in very easy to perform editing processes. There in no need to connect additional editing devices for performing these processes.

In the above description, one desired module is transferred to the video signal processor 15 according to the user's need in order to execute the desired process. However, by sending an appropriate command from the personal computer 3 to the processor 15, it is possible to execute a combination of these processes. More specifically, when the user inputs his/her instruction to execute a combination of several modules onto video data from the video file 7, the personal computer 3 reads the selected several modules from the storage device 17, and then transfers the several modules to the processor 15. In S100, the CPU 152 in the processor 15 combines the received several modules into a single new program, and stores the program into the program memory 154.

Because the modules 311 and the like stored in the storage device 17 can be treated in the same way as ordinary software programs, modules for performing now processes can easily be added to the storage device 17 or written over the modules 311 and the like already stored in the storage device 17.

Because the compression controller 73 is provided to halt operations of all the components in the compressor 60 temporarily, accurate and reliable compression operations can be executed as described above, even when the process of the selected module is relatively complex and therefore the synchronization signal interval increases to reduce the input rate of the non-realtime data. This feature enables the user to perform an extremely wide variety of processes on the non-realtime data, expanding the capacity of non-realtime data editing.

In addition, the module stored in the program memory 1713(NVRAM) 154 in the video signal processor 15 can be easily overwritten with new module, allowing desired processes to be selected from a plurality of process types and eliminating the need to reconnect editing devices. Accordingly, the editing process is greatly facilitated.

It is noted that when the power is switched on or reset, the program memory (NVRAM) 154 of the video signal processor 15 is cleared of all data. The video signal processor 15 Inputs the data 210 received from the file reading portion 13 directly into the file data input switch 21 without performing any, processing operation. In this case, the decoder can create non-processed video data as usual similarly to the first embodiment.

First Modification of Second Embodiment

Next, the moving picture data compression device 1 according to a first modification of the second embodiment will be described with reference to FIGS. 18–20.

In the second embodiment described above, editing processes are performed on video data 210 that is read by the file reading portion 13 from the video file 7 in the order of a time series, however, it may be possible to edit non-realtime data by performing processes on the operations performed by the file reading portion (driver) 13 to read non-realtime data from the video file 7, for example, by modifying the drive processes by the file reading portion 13.

Figure 18:
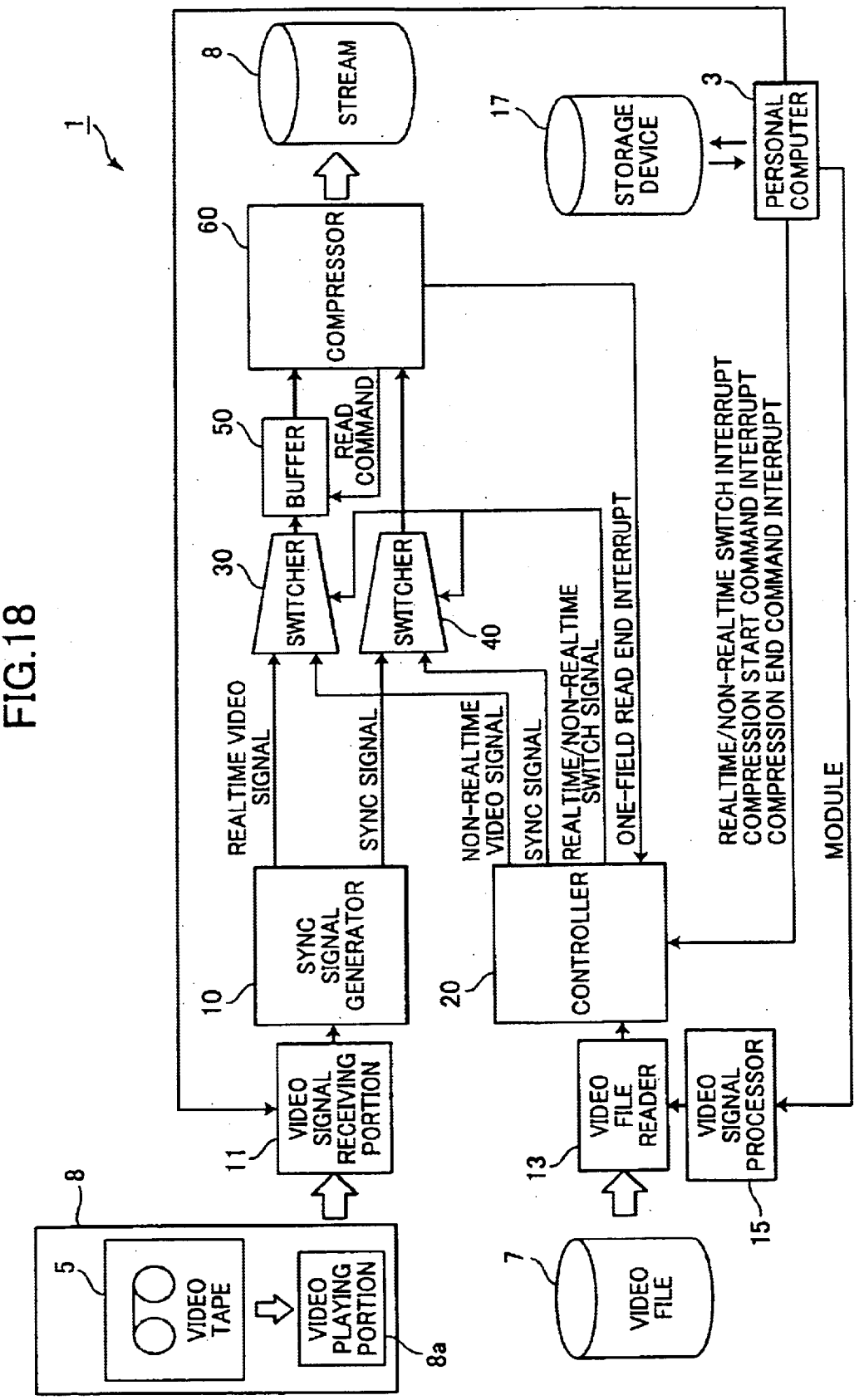
FIG. 18 is a block diagram showing the structure of a moving picture data compression device according to a first modification of the second embodiments.
Figure 19:
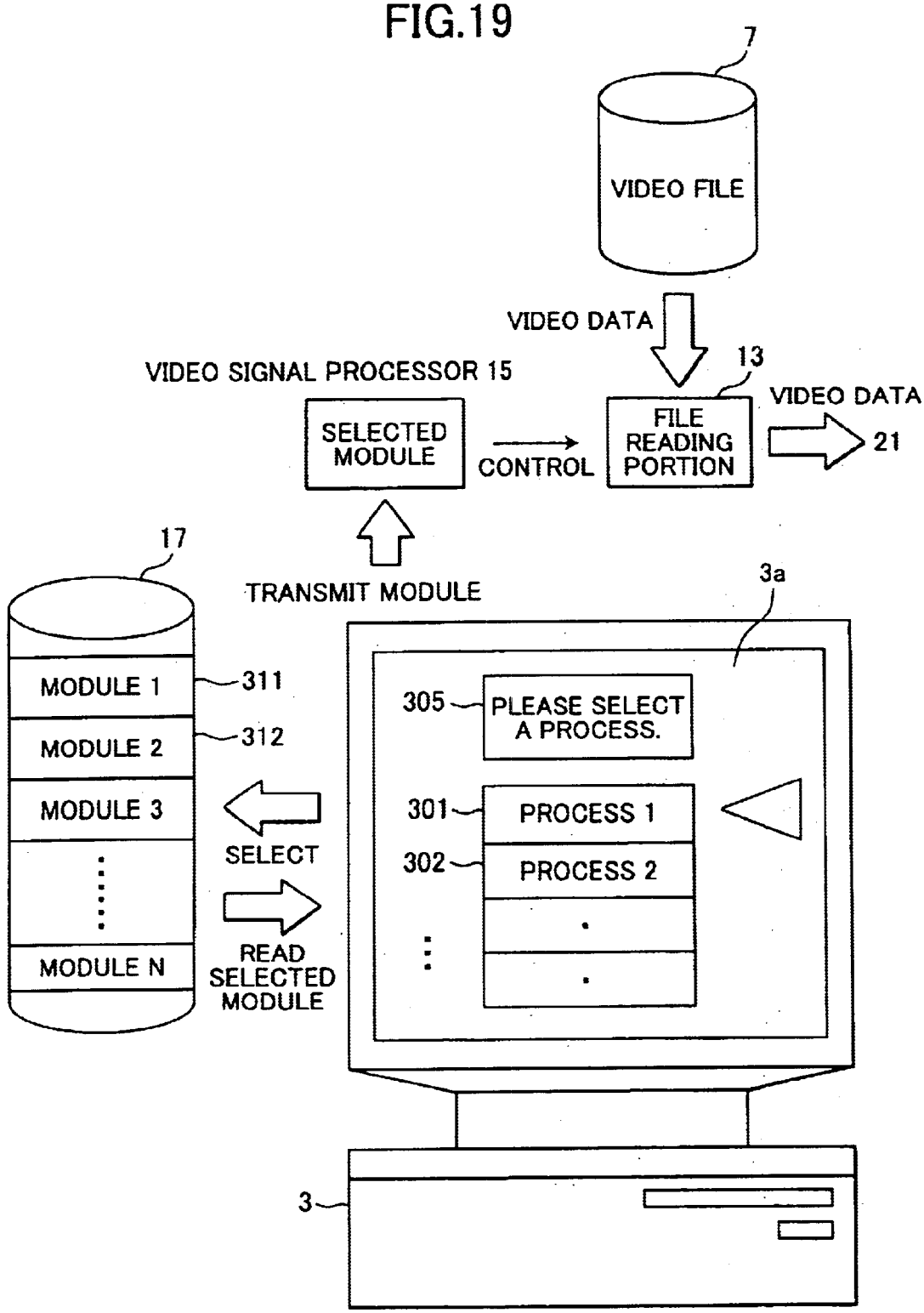
FIG. 19 is an explanatory diagram showing the operations performed by the video signal processor according to the first modification.

That is, according to the present modification, as shown in FIGS. 18 and 19, the video signal processor 15 is provided to control the file reading portion 13 to perform its reading operation (driving operation). The video signal processor 15 executes the module writing-and-executing process of FIG. 16 in the same manner as in the second embodiment, except for the processes of S140 and S160. According to the present modification, in S140 and S160, the video signal processor 15 instructs the file data reading portion 13 to read one field's worth of video data from the data file 7 in a manner corresponding to the module presently stored in the program memory 154, and to supply the video data directly to the file data input switch 21. Accordingly, in S140 and S160, the video signal processor 15 does not receive video data from the file data reading portion 13, and therefore does not perform any processing operation to the video data. The video signal processor 15 merely controls the reading operation of the file data reading portion 13 according to the module presently stored in the program memory 154.

More specifically, when the personal computer 3 issues the compression start command interrupt, the file data input switch 21 receives a file data input start command that to issued in S38 (FIG. 8) from the central arithmetic and program controller 23. As a result, in order to initiate the input of non-realtime data, the file data input switch 21 supplies a read start command to the video signal processor 15 so that the video signal processor 15 will instruct the file reading portion 13 to supply video data from the video file 7 to the file data input switch 21 in a manner corresponding to the module presently stored in the program memory 154. The data thus supplied to the file data input switch 21 is compressed by the compressor 60 in the same manner an in the first embodiment through the processes of FIGS. 6–10.

Figure 20:
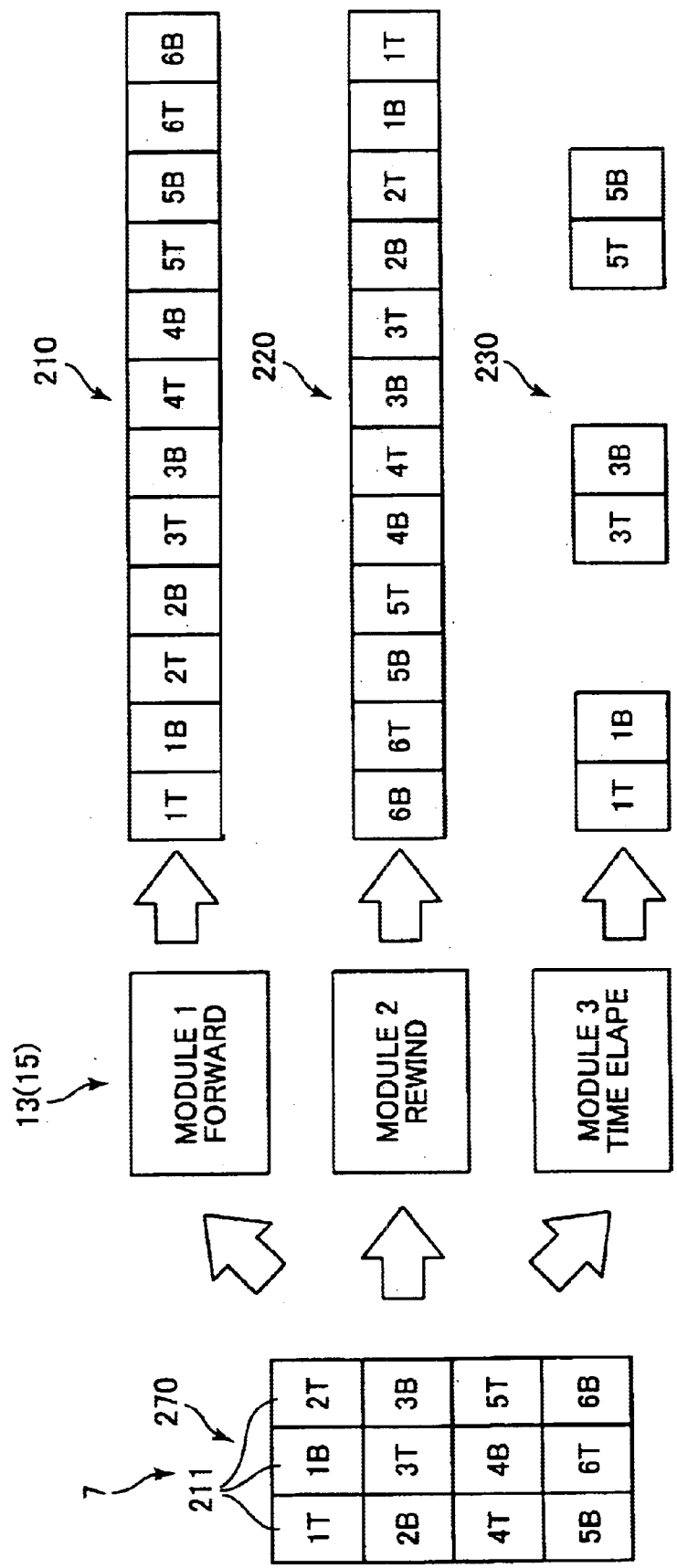
FIG. 20 is an explanatory diagram showing how non-realtime data is processed under control by the video signal processor according to the first modification.

It is noted that as shown in FIG. 20 a non-realtime data 270 stored in the video file 7 in configured such that data 211 in the non-realtime data 270 can be read in any order. It is noted that in the example of FIG. 20, video data 1T of a top field in first frame, video data 1B of a bottom field in first frame, video data 2T of a top field in second frame, video data 2B of a bottom field in second frame, . . . , and video data 6T of a top field in sixth frame, and video data 6B of a bottom field in sixth frame are stored in the video file 7. Normally, the file reading portion 13 reads data 210 according to a time series by specifying in order the addresses of data 211 for the top field of first frame, for the bottom field of first frame, for the top field of second frame, for the bottom field of second frame, and continuing in this way.

When the user selects "module 1", for example, to indicate a forward process, data of the "module 1" is read out by the personal computer 3 from the storage device 17 and is transferred to the video signal processor 15. In this case, the video signal processor 15 controls the file reading portion 13 to read data 210 by specifying the address of data 211 according to the normal time series.

When the user selects "module 2", for example, to indicate a rewind process, data of the "module 2" is read out from the storage device 17 and is transferred to the video signal processor 15. In this case, the video signal processor 15 controls the file reading portion 13 to reverse the address specifications and to read data 220 in the order of the reverse time series.

When the user selects "module 3", for example, to indicate a time lapse process, data of the "module 3" is read out from the storage device 17 and is transferred to the video signal processor 15. In this case, the video signal processor 15 controls the file reading portion 13 to read data 230 by skipping addresses for every other frames.

The video signal processor 15 thus processes the reading operations by the file reading portion 13 as described above, and transfers the read data (210, 220, or 230) directly to the file date input switch 21. The same advantage as described in the second embodiment can be attained. Even rewind and time elapse processes can be performed easily and satisfactorily according to the present modification.

Second Modification of Second Embodiment

Next, the moving picture data compression device 1 according to a second modification of the second embodiment will be described with reference to FIGS. 21–24.

Figure 21:
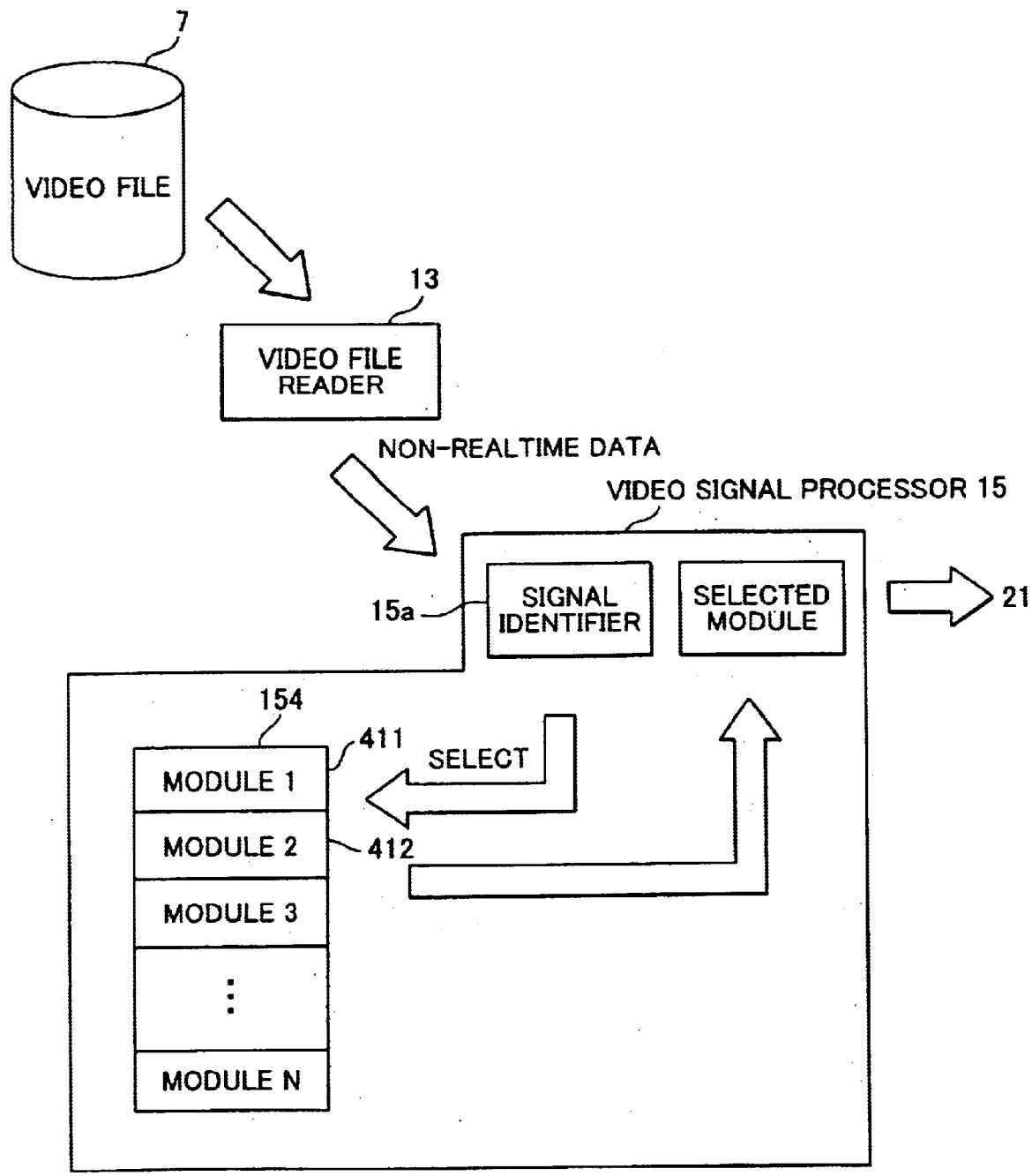
FIG. 21 is an explanatory diagram showing the structure of and operations performed by the video signal processor according to a second modification of the second embodiment.

In the second embodiment, the plurality of modules 311, 312, . . . are stored in the storage device 17. According to the present modification, a plurality of modules 411, 412, . . . are additionally stored in the program memory 154 as shown in FIG. 21.

According to the present modification, non-realtime data is edited, before being stored in the video file 7, so that the non-realtime data include indication data for indicating a process desired to be executed by the video signal processor 15. In this case, processing of non-realtime data can be automatically performed during the process of FIG. 16.

Figure 22:
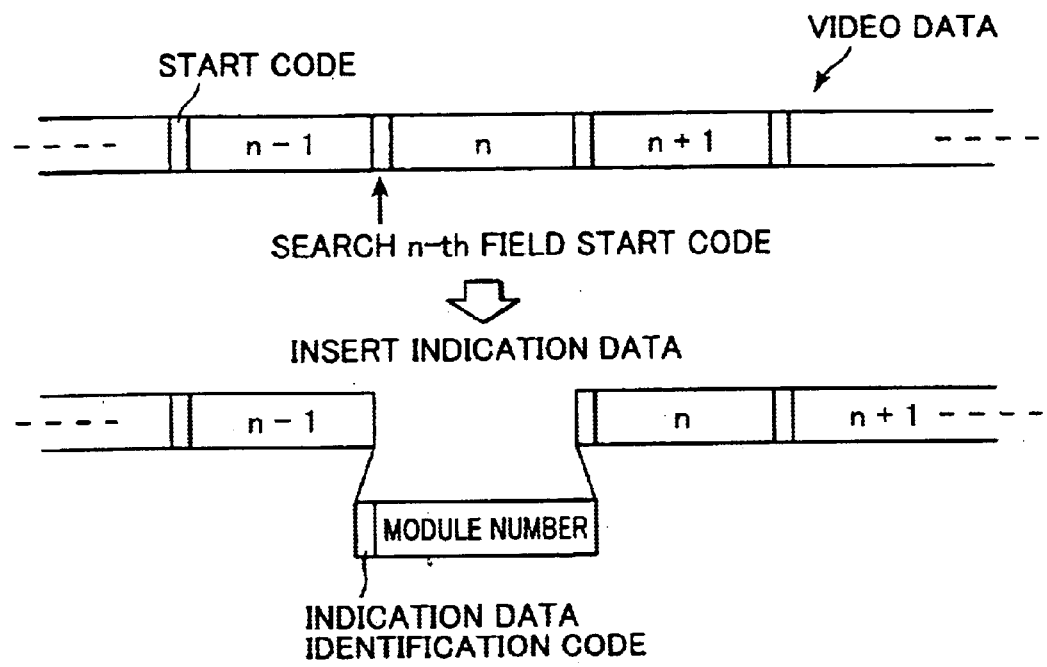
FIG. 22 illustrates how the personal computer 3 inserts indication data in video data according to the second modification.

It in assumed that the user desires that one module in the program memory 154 be subjected onto some fields' worth of video data (n-th field's worth of video data and succeeding fields' worth of data: n is an integer greater than or equal to one (1)). In this case, the video data is edited in a manner described below. First, as shown in FIG. 22, a start code of the n-th field data in searched. Then, indication data indicative of the user's selected module is inserted at the n-th field video data. The indication data is comprised from: data indicative of a module number of the user's selected module, and an indication data identification code identifying that data following the indication data identification code is the indication data. The thus edited video data is stored in the video file 7. It is noted that the above-described editing operation may be performed by the personal computer 3.

Figure 23:
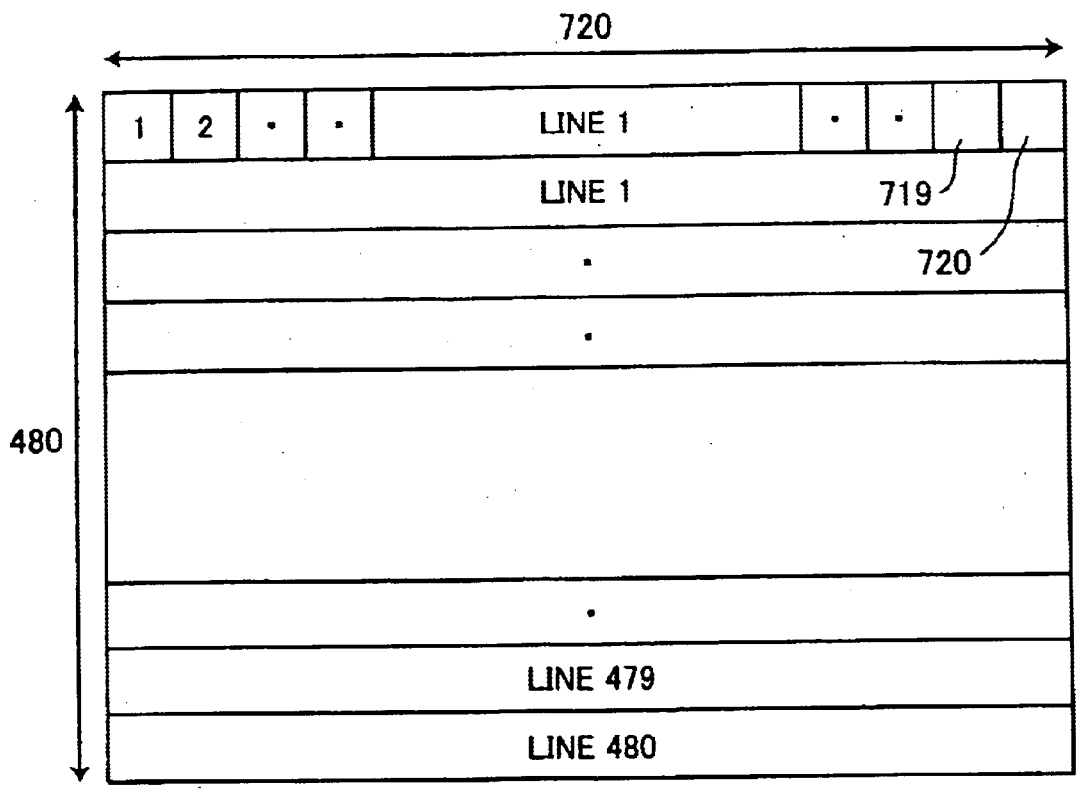
FIG. 23 is an explanatory diagram showing the pixel arrangement in a video image.
Figure 24:
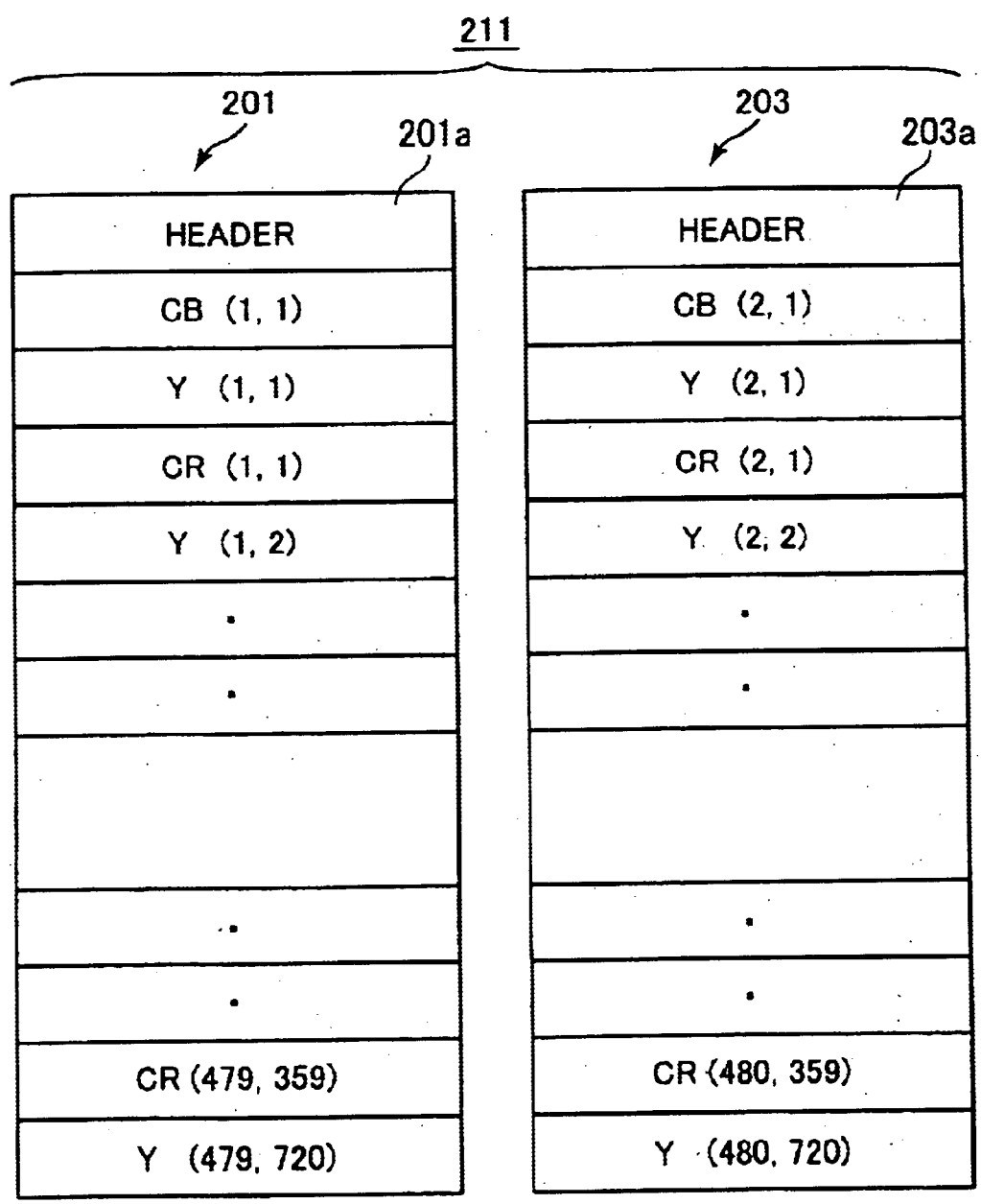
FIG. 24 is an explanatory diagram showing the structure of non-realtime data corresponding to the video image of FIG. 23.

It is noted that video images are normally configured from 480(H)×720(W) pixels as shown in FIG. 23. As described already, non-realtime data 211 for each frame includes top field video data 201 and bottom field video data 203. As shown in FIG. 24, the top field video data 201 includes data for pixels in the odd numbered rows: Cb(1,1)-Y(479,720), for example. The bottom field video data 203 contains date for pixels in the even numbered rows: Cb(2,1)-Y(480,720), for example. Here, the expression Y(m,n) indicates luminance (brightness) data corresponding to pixels in the m-th row and n-th column, will Cb(m,n) and Cr(m,n) indicate color date for pixels in the m-th row and n-th column. It is noted that a combination of data CB and CR signifies a specific color. It in noted that the number of combinations of CB and CR is less than the number of picture elements because each set of data CB and CR is shared by neighboring pixels. For example, a pixel (1, 1) is determined by luminance data Y(1, 1) and a color data combination of CB(1, 1) and CR(1, 1). Another pixel (1, 2) adjacent to the pixel (1, 1) is determined by luminance data Y(1, 2) and a color data combination of CB(1, 2) and CR(1, 1). Still another pixel (1, 3) adjacent to the pixel (1, 2) is determined by luminance data Y(1, 3) and a color data combination of CB(1, 2) and CR(1, 2). Headers 201a and 203a are assigned at the head of the top field video data 201 and bottom field video data 203 respectively. Accordingly, during the above-described editing process, when the indication data is inserted into video data at the user's selected n-th field data, the indication data in written to the corresponding header 201a (or 203a).

According to the present modification, as shown in FIG. 21, the video signal processor 15 is designed to include a signal identifier 15a for identifying the indication data in the video data. During the compression process, when the file data input switch 21 issues a read start command to the video signal processor 15, the video signal processor 15 instructs the video file reading portion 13 to start reading video data from the video file 7 in the same manner as in the second embodiment. When the video signal processor 15 receives video data from the video file reading portion 13, the signal identifier 15a detects whether any indication data is included in the video data. When the signal identifier 15a detects indication data in the video data, the signal identifier 15a selects, from the program memory 154, a module 411 or the like that in indicated by the indication data. With the selected module, the video signal processor 15 will process the n-th and succeeding fields' worth of video data.

Thus, according to the present modification, the video signal processor 15 executes the module writing-and-executing process of FIG. 16, while executing processes in S160 in a manner described below. In S160, the CPU 152 first detects whether any indication data in included in the video data that has been received in S140. When some indication data is included in the video data, the CPU 152 automatically selects a module, indicated by the indication data, from the program memory 154, and then executes a processing operation onto the received video data using the selected module. The CPU 152 will continue executing the processing operation onto successive fields' worth of data using the thus selected module, through repeatedly executing the loop of S120–S200, until receiving in S140 some field date including indication data for another module.

Hence, various editing operations can be executed while switching between operations an desired by the user. Accordingly, it is possible to edit non-realtime data more easily.

It is noted that the indication data included in the video data may indicate the user's desired module in the storage device 17. In this case, the identifier 15a selects the user's desired module from the storage device 17.

While the invention has been described in detail with reference to specific embodiments thereof, it would be apparent to those skilled in the art that many modifications and variations may be made therein without departing from the spirit of the invention, the scope of which is defined by the attached claims.

Figure 25:
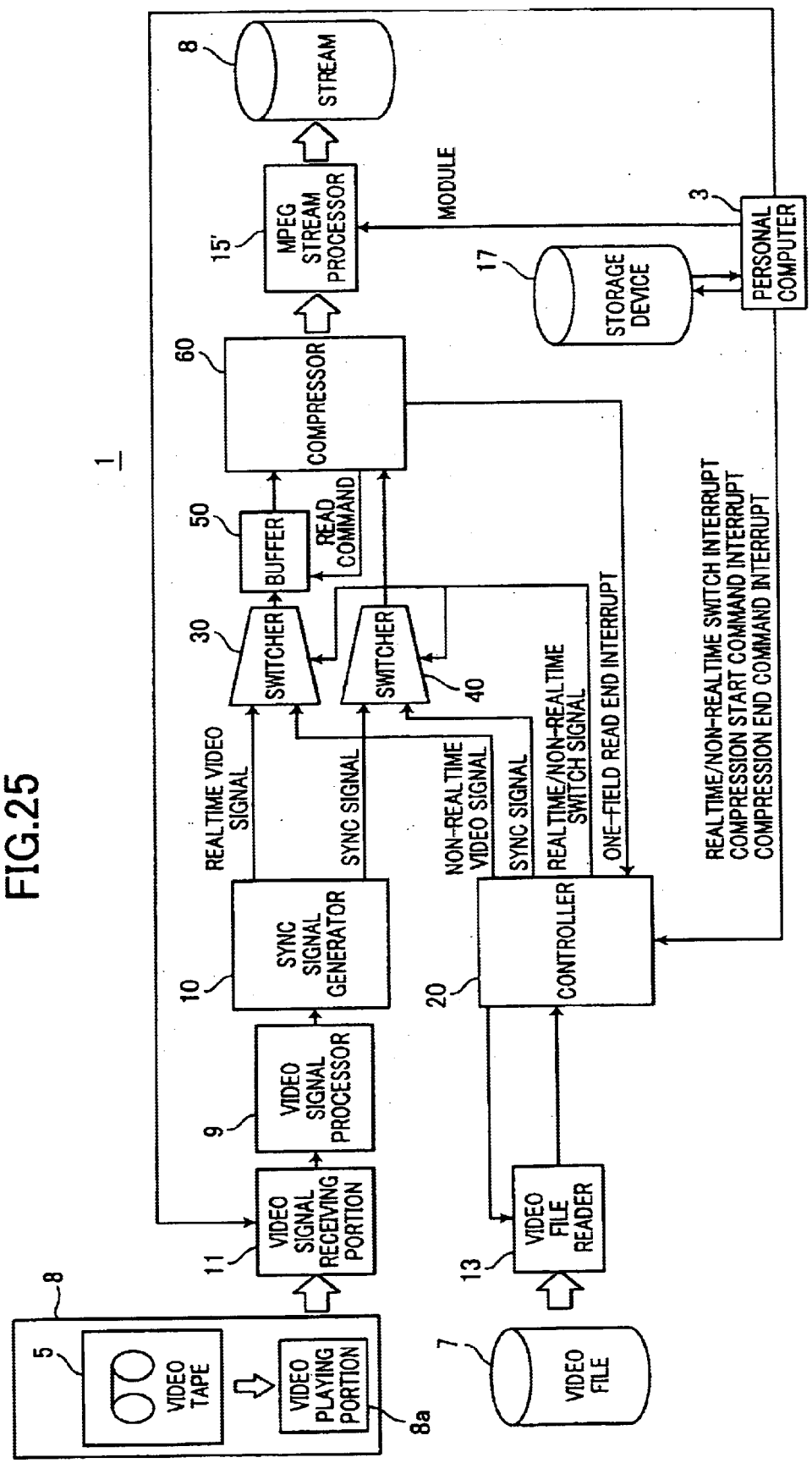
FIG. 25 is a block diagram showing the structure of a moving picture data compression device according to another modification.
Figure 26:
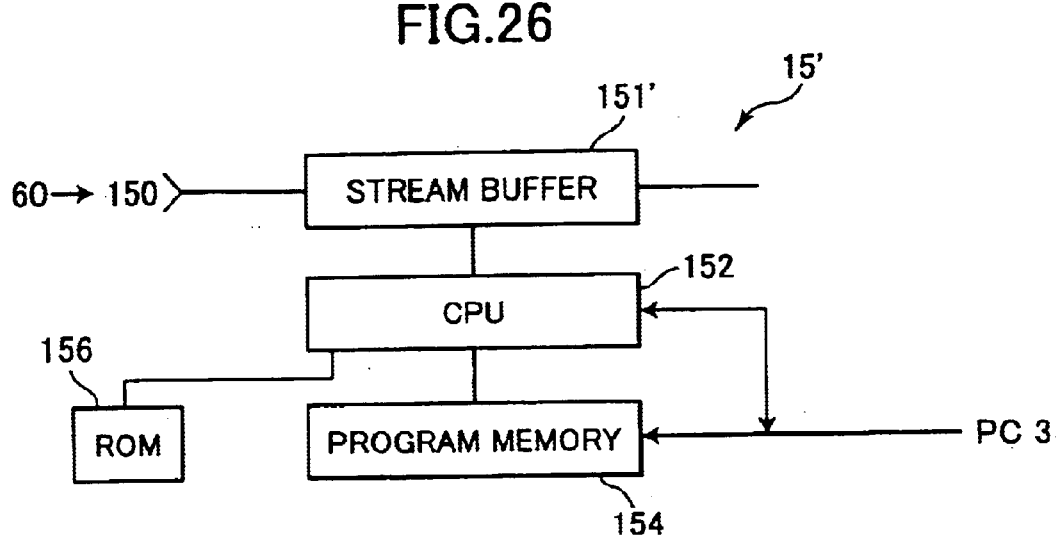
FIG. 26 in a block diagram of a MPEG stream processor according to the modification.
Figure 27:
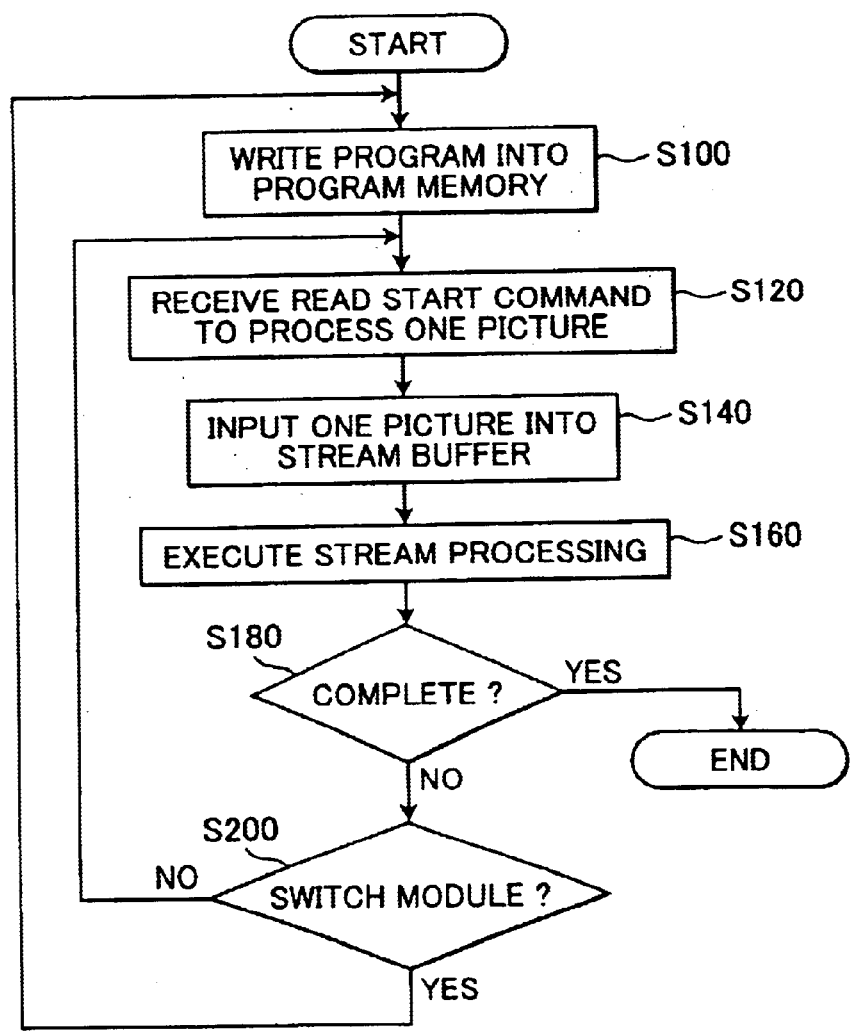
FIG. 27 is a flowchart showing a stream processing operation executed by the NPEG stream processor according to the modification.

For example, in the embodiments described above, non-realtime data is edited or processed before being compressed by the compressor 60. When processing of non-realtime data is performed before compression, an extremely wide variety of processes can be performed because original data is processed directly. However, it is also possible to process the data after compression. That is, the moving picture data compression device 1 may be modified as shown in FIG. 25 so that a MPEG stream processor 15' be provided downstream from the compressor 60. As shown in FIG. 26, the MPEG stream processor 15' has the same structure as that of the video signal processor 15 (FIG. 15) except that a stream buffer 151' is employed instead of the frame memory 151. The MPEG stream processor 15' performs the module writing-and-executing process an shown in FIG. 27. The module writing-and-executing process of FIG. 27 is the same as that of FIG. 16 except that: the CPU 152 in the MPEG stream processor 15' receives in S120 a read start command, from the personal computer 3, to process one set of picture data (one frame's worth of stream); that the CPU 152 receives in S140 one set of picture data from the compressor 60 and stores the picture data into the stream buffer 151'; and that the CPU 152 executes in S160 a stream processing operation onto the received picture data based on the module that has been written into the program memory 154 in S100. In this case, the MPEG stream processor 15' can convert MPEG2 data to MPSG1 data. The MPEG stream processor 15' can eliminate unnecessary data. Hence, it is possible to increase the range of editing functions. When processing compressed non-realtime data (such as variable-length encoded data), processing becomes simpler and faster because the volume of the data has been reduced. Accordingly, it is possible to further reduce the time required to edit non-realtime data. In addition, less memory capacity is needed to store the reduced amount of data, thereby reducing production costs.

When the video signal processor 15 performs editing processes of "time elapse", for example, the moving picture data compression device 1 may be modified to output, in parallel, both a stream 8 containing compressed normal non-realtime data and another stream 8 containing non-realtime data that has been compressed after being subjected to the time lapse editing process. In this case, the former stream 8 is played back on a decoder to obtain normal video, while the latter stream 8 is played back on a decoder to obtain fast-forward video. Accordingly, this method creates a stream 8 specifically for fast-forward video that can easily be viewed on a decoder.

The player portion 8 can be provided integrally with or separately from the moving picture data compression device 1. For example, the moving picture data compression device 1 can be configured to be connected to a commercial video player 8 so that the video player 8 be controlled separately from the device 1 to read video signals from a videotape 5 and to output video signals to the video signal receiving portion 11.

In the embodiments described above, the field end code separator 22 issues a field end code detect interrupt based on the top field start code 205 and bottom field start code 207, thereby allowing the compressor 60 to execute a compression operation for each field of data. However, the controller 20 may be modified to allow the compressor 60 to execute a compression operation for each field of data based on data length if each field of data has a fixed length. The controller 20 may be modified to allow the compressor 60 to execute a compression operation for each frame. Further, the moving picture data can be compressed according to a standard other than the MPEG standard.

In the embodiments described above, the compression controller 73 performs the operations to delay the compression operations executed by the compressor 60. However, the moving picture data compression device 1 can be configured to delay compression operations in many other ways.

In the above-described embodiments, the video signal processor 15 is comprised from a microcomputer shown in FIG. 15. However, the video signal processor 15 may be configured as a software process executed by the personal computer 3.

Similarly, in the above-described embodiments, the file reading portion 13 is comprised from a microcomputer. However, the file reading portion 13 may be configured as a software process executed by the personal computer 3. Similarly, the controller 20 may be configured as a software process executed by the personal computer 3.

In the above-described embodiments, the videotape 5 is employed am a realtime recording medium. However, it is possible to use other various types of realtime recording mediums, on which moving picture data has been recorded to be read sequentially according to the passage of time. In the above-described embodiments, the video file 7 is employed as a non-realtime recording medium. However, it is possible to use other various types of non-realtime recording mediums, on which moving picture data has been recorded to be read unrelated to the passage of time.

In the above-described embodiments, the compression controller 73 halts or stops operation of all the elements in the compressor 60 after compressing one field's worth of date until receiving the next synchronization signal. However, it is sufficient that the compression controller 73 halt or stop operation of at least the elements 62, 66, 67, 68, 69, and 71, which cooperate to detect difference between successively-received sets of video data, after compressing one field's worth of data until receiving the next synchronization signal.

In the above-described embodiments, the compressor 60 has the structure shown in FIG. 5. However, the compressor 60 may have other various structures.

What is claimed is:

1. A moving picture data compression device for compressing moving picture data read from a recording medium recorded with moving picture data, comprising:

non-realtime data receiving means for reading moving picture data from a non-realtime data recording medium, which is recorded with moving picture data that is capable of being read unrelated to the passage of time;

synchronization signal generating means for generating a synchronization signal based on moving picture data received by the non-realtime data receiving means;

realtime data receiving means for reading moving picture data from a realtime data recording medium, which is recorded with moving picture data capable of being read sequentially according to the actual passage of time;

additional synchronization signal generating means for generating a synchronization signal according to a receiving operation by the realtime data receiving means; and compressing means for selectively executing either non-realtime data compression operations for compressing moving picture data received by the non-realtime data receiving means according to the synchronization signal generated by the synchronization signal generating means or realtime data compression operations for compressing moving picture data received by the realtime data receiving means according to the synchronization signal generated by the additional synchronization signal generating means.

2. A moving picture data compression device as claimed in claim 1, wherein the non-realtime data receiving means includes non-realtime data reading means for reading moving picture data from the non-realtime data recording medium, wherein said synchronization signal generating means generates the synchronization signal based on the moving picture data read by the non-realtime data reading means, and wherein said compressing means executes the non-realtime data compression operations for compressing moving picture data, read by the non-realtime data reading means, according to the synchronization signal.

3. A moving picture data compression device as claimed in claim 2, wherein the non-realtime data receiving means further includes non-realtime data read controlling means for controlling operations of the non-realtime data reading means to read moving picture data from the non-realtime data recording medium.

4. A moving picture data compression device as claimed in claim 3, wherein said synchronization signal generating means generates the synchronization signal based on the moving picture data, from the non-realtime data recording medium, in accordance with the reading operation achieved by the non-realtime data reading means as controlled by the non-realtime data read controlling means.

5. A moving picture data compression device as claimed in claim 1, wherein the realtime data receiving means includes realtime data reading means for reading moving picture data from a realtime data recording medium.

6. A moving picture data compression device as claimed in claim 1, wherein the compression means includes switching means for receiving an instruction signal indicative of a desire whether to perform the realtime data compression operations or to perform the non-realtime data compression operations, and for switching the function of the compressing means between the realtime data compression operations and the non-realtime data compression operations according to the received instruction signal.

7. A moving picture data compression device as claimed in claim 1, further comprising delaying means for controlling the compressing means to delay performing the non-realtime data compression operations when a time interval, in which the synchronization signal generating means generates a synchronization signal, is longer than a period of time required by the compressing means to perform non-realtime data compression operations.

8. A moving picture data compression device as claimed in claim 7, wherein the compressing means detects a difference between successively-received moving picture data to execute at least non-realtime data compression operations,
wherein the delaying means controls the compression means to delay performing the non-realtime data compression operations by controlling the compressing means to halt temporarily operations at least involved in detecting the difference.

9. A moving picture data compression device as claimed in claim 2, further comprising:
processing means capable of executing at least two types of processes on either one of moving picture data read by the non-realtime data reading means and operations of the non-realtime data reading means; and
selecting means for selecting one of the at least two types of processes to be executed by the processing means.

10. A moving picture data compression device as claimed in claim 9,
wherein the compressing means receives either one of the non-realtime data processed by the processing means and the non-realtime data read by the non-realtime data reading means whose operation is processed by the processing means,
further comprising delaying means for controlling the compression means to delay performing compression operations when a period of time, required for the processing means to execute selected processes, is longer than another period of time required for the compressing means to perform the non-realtime data compression processes.

11. A moving picture data compression device as claimed in claim 9, wherein the processing means executes the selected processes on the non-realtime data before the compressing means performs compression operations.

12. A moving picture data compression device as claimed in claim 9, wherein the processing means executes the selected processes on non-realtime data after the compressing means performs compression operations onto the non-realtime data.

13. A moving picture data compression device as claimed in claim 9, wherein the non-realtime data includes indication data indicating processes to be executed by the processing means,
wherein the selecting means selects the processes indicated by the indication data.

14. A moving picture data compression device as claimed in claim 1, wherein the non-realtime data includes a plurality of groups of moving picture data, each group indicating a corresponding moving picture unit, the plurality of groups indicating a successive series of the moving picture units;
wherein the synchronization signal generating means generates the synchronization signal when the non-realtime data receiving means receives one data group indicative of one moving picture unit; and
wherein a control means controls said compressing means to compress the one data group indicative of the one moving picture unit upon receipt of the synchronization signal.

15. A moving picture data compression device for compressing moving picture data read from a recording medium recorded with moving picture data, comprising:
non-realtime data receiving means for reading moving picture data from a non-realtime data medium that is recorded with moving picture data capable of being read without regard for the passage of time;
compressing means capable of compressing moving picture data;
processing means capable of executing at least two types of processes, other than the compressing operation, on moving picture data received by the non-realtime data receiving means;
selecting means for selecting one of the at least two types of processes to be executed by the processing means on the moving picture data; and
synchronization signal generating means for generating a synchronization signal based on moving picture data received by the non-realtime data receiving means, the compressing means executing non-realtime data compression operations for compressing moving picture data received by the non-realtime data receiving means according to the synchronization signal generated by the synchronization signal generating means.

16. A moving picture data compression device as claimed in claim 15, wherein the non-realtime data receiving means includes:
non-realtime data reading means for reading moving picture data from the non-realtime data medium; and
read controlling means for controlling the operations of the non-realtime data reading means,
wherein the processing means is capable of executing at least two types of processes on either moving picture data read by the non-realtime data reading means or operations of the non-realtime data reading means that are controlled by the read controlling means, the selecting means selecting one of the at least two types of processes to be executed by the processing means on the moving picture data or the operations.

17. A moving picture data compression device as claimed in claim 16, further comprising delaying means for delaying compression operations performed by the compressing means when the time required for the processing means to execute selected processes is longer than the time required for the compressing means to perform compressing processes.

18. A moving picture data compression device as claimed in claim 16, wherein the processing means executes the selected processes on moving picture data before the compressing means performs compression operations.

19. A moving picture data compression device as claimed in claim 16, wherein the processing means executes the selected processes on moving picture data after the compressing means performs compression operations.

20. A moving picture data compression device as claimed in claim 16, wherein the moving picture data includes indication data indicating one of the at least two types of processes to be executed by the processing means; and the selecting means includes detection means for detecting the indication data and for changing the process to be executed by the processing means based on the detected indication data.

21. A moving picture data compression device as claimed in claim 15, wherein the non-realtime data receiving means includes non-realtime data reading means for reading moving picture data from the non-realtime data medium; and wherein the processing means includes:
- a memory storing the moving picture data read by the non-realtime data reading means; and
- a processor processing the moving picture data stored in the memory in an operation corresponding to the selected process.

22. A moving picture data compression device as claimed in claim 15, wherein the non-realtime data receiving means includes non-realtime data reading means for reading moving picture data from the non-realtime data medium; and
   wherein the processing means includes a controller controlling the non-realtime data reading means to read the moving picture data from the non-realtime data medium in a manner corresponding to the selected process.

23. A moving picture data compression device as claimed in claim 15, wherein the processing means executes the selected one type of processes on moving picture data read by the non-realtime data receiving means, the compressing means compressing the moving picture data processed by the processing means.

24. A moving picture data compression device as claimed in claim 15, wherein the compressing means compresses moving picture data read by the non-realtime data receiving means, the processing means executing the selected one type of processes on the compressed moving picture data.

25. A moving picture data compression device as claimed in claim 15, wherein the non-realtime data includes a plurality of groups of moving picture data, each group indicating a corresponding moving picture unit, the plurality of groups indicating a successive series of the moving picture units,
   wherein said synchronization signal generating means generates the synchronization signal when the non-realtime data receiving means receives one data group indicative of one moving picture unit, and
   wherein control means controls said compressing means to compress the one data group indicative of the one moving picture unit upon receipt of the synchronization signal.

26. A moving picture data compression device as claimed in claim 15, wherein the at least two types of processes to be executed by the processing means on moving picture data are processes for adding visual effects on moving picture data received by the non-realtime data receiving means.

27. A moving picture data compression device for compressing moving picture data read from a recording medium recorded with moving picture data, comprising:
   a non-realtime data reader reading moving picture data from a non-realtime data recording medium, which is recorded with moving picture data that is capable of being read unrelated to the passage of time;
   a synchronization signal generating unit generating a synchronization signal based on moving picture data received by the non-realtime data reader;
   a realtime data reader reading moving picture data from a realtime data recording medium, which is recorded with moving picture data capable of being read sequentially according to the actual passage of time;
   an additional synchronization signal generating unit generating a synchronization signal according to a receiving operation by the realtime data reader; and
   a compressing unit selectively executing either non-realtime data compression operations for compressing moving picture data received by the non-realtime data reader according to the synchronization signal generated by the synchronization signal generating unit or realtime data compression operations for compressing moving picture data received by the realtime data reader according to the synchronization signal generated by the additional synchronization signal generating unit.

28. A moving picture data compression device as claimed in claim 27, wherein the non-realtime data reader includes a non-realtime reading unit reading moving picture data from the non-realtime data recording medium;
   wherein the non-realtime data includes a plurality of groups of moving picture data, each group indicating a corresponding picture field, the plurality of groups indicating a successive series of picture fields;
   wherein the synchronization signal generating unit generates the synchronization signal when the non-realtime data reader reads one data group indicative of one picture field; and
   wherein a control unit controls said compressing unit to compress the one data group indicative of the one picture field upon receipt of the synchronization signal.

29. A moving picture data compression device for compressing moving picture data read from a recording medium recorded with moving picture data, comprising:
   a non-realtime data reader reading moving picture data from a non-realtime data medium that is recorded with moving picture data capable of being read without regard for the passage of time;
   a compressing unit capable of compressing moving picture data;
   a processing unit capable of executing at least two types of processes, other than the compressing process, on moving picture data received by the non-realtime data reader;
   a selecting unit selecting one of the at least two types of processes to be executed by the processing unit on the moving picture data; and
   a synchronization signal generating unit generating a synchronization signal based on moving picture data received by the non-realtime data reader, the compressing unit executing non-realtime data compression operations for compressing moving picture data received by the non-realtime data reader according to the synchronization signal generated by the synchronization signal generating unit.

30. A moving picture data compression device as claimed in claim 29, wherein the non-realtime data reader includes a non-realtime data reading unit reading moving picture data from the non-realtime data medium; and
   wherein the processing unit includes:
   a memory storing the moving picture data read by the non-realtime data reading unit; and
   a processor processing the moving picture data stored in the memory in an operation corresponding to the selected process.

31. A moving picture data compression device as claimed in claim 29, wherein the non-realtime data reader includes a non-realtime data reading unit reading moving picture data from the non-realtime data medium; and
   wherein the processing unit includes a controller controlling the non-realtime data reader to read the moving picture data from the non-realtime data medium in a manner corresponding to the selected process.

32. A moving picture data compression device as claimed in claim 29, wherein the processing unit executes the selected one type of processes on moving picture data read by the non-realtime data reader, the compressing unit compressing the moving picture data processed by the processing unit.

33. A moving picture data compression device as claimed in claim 29, wherein the compressing unit compresses moving picture data read by the non-realtime data reader, the processing unit executing the selected one type of processes on the compressed moving picture data.

34. A moving picture data compression device as claimed in claim 29, wherein the non-realtime data includes a plurality of groups of moving picture data, each group indicating a corresponding picture field, the plurality of groups indicating a successive series of picture fields, wherein said synchronization signal generating unit generates the synchronization signal when the non-realtime data reading unit reads one data group indicative of one picture field, and wherein a control unit controls said compressing unit to compress the one data group indicative of the one picture field upon receipt of the synchronization signal.

35. A moving picture data compression device as claimed in claim 29, wherein the at least two types of processes to be executed by the processing unit on moving picture data are processes for adding visual effects on moving picture data received by the non-realtime data reader.

* * * * *